United States Patent
Asirvatham et al.

(10) Patent No.: US 12,466,846 B2
(45) Date of Patent: Nov. 11, 2025

(54) SILOXANE DERIVATIVES OF AMINO ACIDS HAVING SURFACE-ACTIVE PROPERTIES

(71) Applicant: AdvanSix Resins & Chemicals LLC, Parsippany, NJ (US)

(72) Inventors: Edward Asirvatham, Chatham, NJ (US); Kavssery Parameswaran Ananthapadmanabhan, Loveland, OH (US); Harshita Kumari, Cincinnati, OH (US); Ramana Reddy Mittapalli, Cincinnati, OH (US); Marzieh Susanna Mirzamani, Cincinnati, OH (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 476 days.

(21) Appl. No.: 18/112,790

(22) Filed: Feb. 22, 2023

(65) Prior Publication Data
US 2023/0265112 A1  Aug. 24, 2023

Related U.S. Application Data

(60) Provisional application No. 63/313,115, filed on Feb. 23, 2022.

(51) Int. Cl.
C07F 7/08 (2006.01)

(52) U.S. Cl.
CPC ............ C07F 7/0838 (2013.01); C07F 7/081 (2013.01)

(58) Field of Classification Search
CPC .............................. C07F 7/0838; C07F 7/081
See application file for complete search history.

(56) References Cited

U.S. PATENT DOCUMENTS

| | | | |
|---|---|---|---|
| 3,624,120 A | 11/1971 | Yetter | |
| 3,929,678 A | 12/1975 | Laughlin et al. | |
| 5,041,590 A | 8/1991 | Snow | |
| 5,162,155 A | 11/1992 | Berndt et al. | |
| 6,013,683 A | 1/2000 | Hill et al. | |
| 7,622,512 B2 | 11/2009 | Schorzman et al. | |
| 10,053,619 B2 | 8/2018 | Saboowala et al. | |
| 11,008,348 B2 | 5/2021 | Asirvatham et al. | |
| 11,427,760 B2 | 8/2022 | Asirvatham | |
| 11,525,105 B2 | 12/2022 | Asirvatham | |
| 11,542,428 B2 | 1/2023 | Asirvatham | |
| 11,571,377 B2 | 2/2023 | Asirvatham | |
| 11,633,481 B2 | 4/2023 | Asirvatham | |
| 11,891,568 B2 | 2/2024 | Asirvatham | |
| 11,905,304 B2 | 2/2024 | Asirvatham | |
| 11,952,394 B2 | 4/2024 | Asirvatham et al. | |
| 11,999,890 B2 | 6/2024 | Asirvatham | |
| 12,049,589 B2 | 7/2024 | Asirvatham | |
| 12,054,663 B2 | 8/2024 | Asirvatham | |
| 2007/0099805 A1 | 5/2007 | Phenis et al. | |
| 2007/0104778 A1 | 5/2007 | Zeng et al. | |
| 2007/0142583 A1 | 6/2007 | Schorzman et al. | |
| 2008/0152540 A1 | 6/2008 | Schorzman et al. | |
| 2010/0063310 A1 | 3/2010 | Knepper et al. | |
| 2010/0215959 A1 | 8/2010 | Jonschker et al. | |
| 2012/0093746 A1 | 4/2012 | Moriya | |
| 2013/0130508 A1 | 5/2013 | Wu et al. | |
| 2018/0057732 A1 | 3/2018 | Babcock et al. | |
| 2018/0362716 A1 | 12/2018 | Okamura | |
| 2019/0112549 A1 | 4/2019 | Bauer et al. | |
| 2020/0148831 A1 | 5/2020 | Okamura | |
| 2020/0231608 A1 | 7/2020 | Okamura | |
| 2021/0054002 A1 | 2/2021 | Asirvatham et al. | |
| 2021/0186842 A1 | 6/2021 | Asirvatham | |
| 2021/0187110 A1 | 6/2021 | Asirvatham | |
| 2021/0187460 A1 | 6/2021 | Asirvatham | |
| 2021/0188882 A1 | 6/2021 | Asirvatham | |
| 2021/0189292 A1 | 6/2021 | Asirvatham | |
| 2021/0198555 A1 | 7/2021 | Asirvatham | |
| 2021/0230194 A1 | 7/2021 | Asirvatham et al. | |
| 2021/0238479 A1 | 8/2021 | Asirvatham | |
| 2022/0380669 A1 | 12/2022 | Asirvatham | |
| 2023/0058204 A1 | 2/2023 | Asirvatham | |
| 2024/0294556 A1 | 9/2024 | Asirvatham et al. | |
| 2024/0376371 A1 | 11/2024 | Asirvatham | |

FOREIGN PATENT DOCUMENTS

| | | |
|---|---|---|
| CN | 101356201 A | 1/2009 |
| CN | 102614808 A | 8/2012 |
| CN | 104826140 A | 8/2015 |
| CN | 107497365 A | 12/2017 |
| CN | 107522726 A | 12/2017 |

(Continued)

OTHER PUBLICATIONS

Amino Acid—Britannica Online Encyclopedia (Jul. 17, 2009) (Year: 2009).
International Preliminary Report on Patentability received for PCT Patent Application No. PCT/US2023/013612, mailed on Sep. 6, 2024, 08 pages.
International Search Report and Written Opinion received for PCT Patent Application No. PCT/US20/64345, mailed on Apr. 12, 2021, 9 pages.
International Search Report and Written Opinion received for PCT Patent Application No. PCT/US20/64347, mailed on Mar. 10, 2021, 7 pages.
International Search Report and Written Opinion received for PCT Patent Application No. PCT/US20/64684, mailed on Mar. 25, 2021, 14 pages.

(Continued)

*Primary Examiner* — Kamal A Saeed
(74) *Attorney, Agent, or Firm* — Faegre Drinker Biddle & Reath LLP

(57) ABSTRACT

The present disclosure provides siloxane derivatives of amino acids that have surface-active properties. The amino acid can be naturally-occurring or synthetic, or they may be obtained via a ring-opening reaction of a lactam, such as caprolactam. The amino acid may be functionalized with a siloxane group to form a compound that is surface-active and has surfactant characteristics. The compounds have low critical micelle concentrations (CMC) as well as the ability to lower the surface tension of a liquid.

19 Claims, 6 Drawing Sheets

(56) References Cited

FOREIGN PATENT DOCUMENTS

| | | | |
|---|---|---|---|
| CN | 107602862 A | 1/2018 | |
| CN | 107698615 A | 2/2018 | |
| EP | 0164514 A1 | 12/1985 | |
| EP | 0436359 A2 | 7/1991 | |
| EP | 2024423 A2 | 2/2009 | |
| EP | 2458622 A2 | 5/2012 | |
| GB | 1429143 A | 3/1976 | |
| GB | 1470250 A | 4/1977 | |
| GB | 1473201 A | 5/1977 | |
| GB | 1473202 A | 5/1977 | |
| KR | 10-2012-0038898 A | 4/2012 | |
| KR | 10-2015-0108143 A | 9/2015 | |
| TW | 201307372 A | 2/2013 | |
| TW | 202112790 A | 4/2021 | |
| WO | 00/26206 A1 | 5/2000 | |
| WO | 02/46517 A1 | 6/2002 | |
| WO | 03/93352 A1 | 11/2003 | |
| WO | 2007/075320 A2 | 7/2007 | |
| WO | 2007/141565 A2 | 12/2007 | |
| WO | 2009/085297 A2 | 7/2009 | |
| WO | 2015/041214 A1 | 3/2015 | |
| WO | 2016/191148 A1 | 12/2016 | |
| WO | 2021/003455 A1 | 1/2021 | |
| WO | 2021/034550 A1 | 2/2021 | |

OTHER PUBLICATIONS

International Search Report and Written Opinion received for PCT Patent Application No. PCT/US20/64687, mailed on Mar. 31, 2021, 12 pages.

International Search Report and Written Opinion received for PCT Patent Application No. PCT/US20/64692, mailed on Apr. 7, 2021, 9 pages.

International Search Report and Written Opinion received for PCT Patent Application No. PCT/US20/66027, mailed on Apr. 7, 2021, 12 pages.

International Search Report and Written Opinion received for PCT Patent Application No. PCT/US20/66031, mailed on Apr. 8, 2021, 12 pages.

International Search Report and Written Opinion received for PCT Patent Application No. PCT/US2020/045797, mailed on Oct. 26, 2020, 11 pages.

International Search Report and Written Opinion received for PCT Patent Application No. PCT/US2023/013612, mailed on May 25, 2023, 10 pages.

Membership of the Commission, 56 Pure & Applied Chemistry, 595-624 (1984) (Year: 1984).

Stanbro et al., "Cationic silicones for use in contact lens application", Polymer Preprints, 51(2), 2010, pp. 305-306.

SILOXANE DERIVATIVES OF AMINO ACIDS HAVING SURFACE-ACTIVE PROPERTIES

CROSS-REFERENCE TO RELATED APPLICATIONS

This application claims benefit to U.S. provisional Application 63/313,115, filed Feb. 23, 2022 which is incorporated herein by reference in its entirety.

FIELD

The present disclosure pertains to siloxane derivatives of amino acids and methods for their synthesis, wherein the siloxane derivatives have surface-active properties.

BACKGROUND

Surfactants (molecules with surface-active properties) are an important class of molecules with highly sought-after characteristics. Surfactants may be uncharged, zwitterionic, cationic, or anionic. Often, these compounds are amphiphilic molecules with a water-insoluble hydrophobic "tail" group and a water-soluble hydrophilic "head" group. These compounds may adsorb at an interface, such as an interface between two liquids, a liquid and a gas, or a liquid and a solid. In the case of an interface between water and oil, the hydrophilic head group extends into the water, while the hydrophobic tail extends into the oil. When added to water, the hydrophilic head group extends into the water, while the hydrophobic tail extends into the air. The presence of the surfactant disrupts the intermolecular interaction between water molecules, replacing it with weaker interactions between water molecules and the surfactant. This results in lowered surface tension and can also serve to stabilize the interface.

At sufficiently high concentrations, surfactants may form aggregates to limit the exposure of the hydrophobic tail to the polar solvent. One such aggregate is a micelle, in which the molecules are arranged in a sphere with the hydrophobic tails inside the sphere and the hydrophilic heads on the outside to interact with a polar solvent. The effect that a given compound has on surface tension and the concentration at which it forms micelles may serve as defining characteristics for a surfactant.

Surfactants are widely used in commercial applications in formulations ranging from detergents to hair care products to cosmetics. Compounds with surface-active properties are used as soaps, detergents, lubricants, wetting agents, foaming agents, and spreading agents, among others. Thus, there is an ongoing need to identify and synthesize such compounds.

However, solely from its structure, it can be difficult to predict whether a given compound would have surface-active properties or the requisite surface-active properties demanded by the end-use, let alone other important characteristics such as interfacial adsorption dynamics, minimum surface tension achievable, and/or ability to wet hydrophobic and/or oleophobic surfaces, which are also integral to whether the compound would become a useful surfactant. Certain amino acids and their derivatives, for example, are desirable as building blocks for surfactants, but the selection of which amino acids to use is far from intuitive. Likewise, some siloxanes are known to possess surface-active properties, but again, predicting which siloxane will be effective is highly challenging. Synthesis of such compounds adds another layer of difficulty due to the differences of solubilities attributable to different elements and moieties present in the same molecules. There remains a need for high-efficacy surfactants that can be readily synthesized at commercial scale via straightforward routes.

SUMMARY

The present disclosure provides siloxane derivatives of amino acids that have surface-active properties. The amino acids may be naturally occurring or synthetic amino acids, or they may be obtained via ring-opening reactions of molecules such as lactams, for example caprolactam. The amino acids may be functionalized with different types of siloxane groups to form compounds with surface-active properties. Characteristically, these compounds may have low critical micelle concentrations (CMC) and/or the ability to reduce the surface tension of a liquid.

The present disclosure provides compounds of Formula I, below:

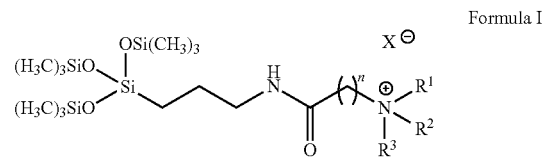

Formula I wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

$R^3$ may be selected from the group consisting of alkenyl, alkynyl, ester, alcohol, aryl alkyl, alkoxy alkyl ether, alkyl phosphate, $C_3$-$C_8$ carboxylic acid, $C_1$-$C_{10}$ alkyl benzoic acid, or a $C_1$-$C_6$ linker attached to a second molecule of Formula I, wherein the second molecule is the same or different;

n may be an integer from 1 to 12; and

X may be selected from the group consisting of chloride, bromide, and iodide.

Specifically, $R^3$ may be selected from the group consisting of $C_2$-$C_{10}$ alkenyl, $C_2$-$C_{10}$ alkynyl, $C_2$-$C_{12}$ ester, $C_1$-$C_{10}$ hydroxyl, benzyl, $C_2$-$C_{12}$ alkoxy alkyl ether, alkyl phosphate, $C_3$-$C_8$ carboxylic acid, $C_1$-$C_5$ alkyl benzoic acid, or a three-carbon linker attached to a second molecule of Formula I, wherein the second molecule is the same as the first.

More specifically, $R^3$ may be selected from the group consisting of the formulas below:

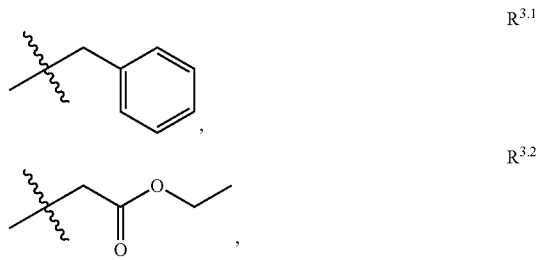

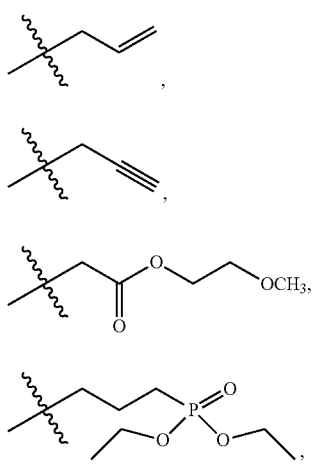

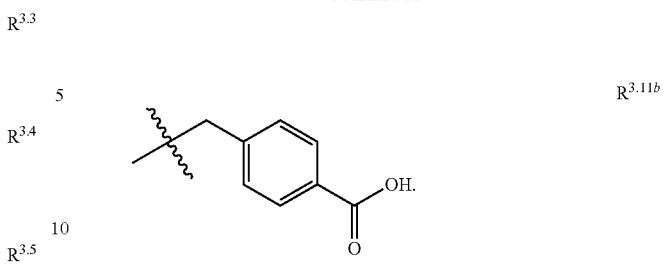

Further compounds provided by the present disclosure are those compounds of Formula I wherein $R^1$ and $R^2$ are methyl.

Other compounds provided by the present disclosure are compounds of Formula I, wherein n is 5.

The present disclosure further provides compounds of Formula II, below:

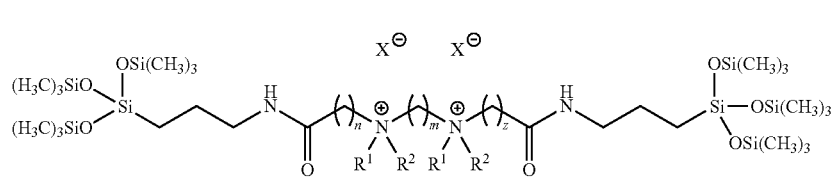

Formula II

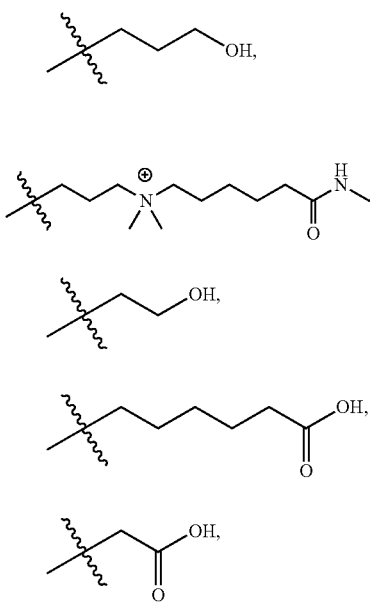

wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

n and z may be selected independently from any integer from 1 to 12;

m may be any integer from 1 to 12; and

X may be independently selected from the group consisting of chloride, bromide, and iodide.

One specific compound provided by the present disclosure and referred to herein as Surfactant 1 is N-benzyl-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

Surfactant 1

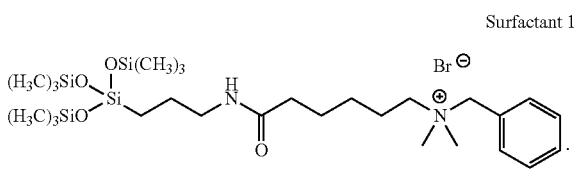

A further specific compound provided by the present disclosure and referred to herein as Surfactant 2 is N-(2-ethoxy-2-oxoethyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

Surfactant 2

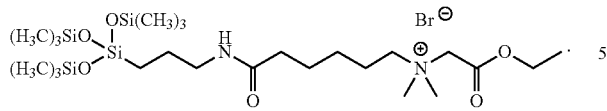

A further specific compound provided by the present disclosure and referred to herein as Surfactant 3 is N-allyl-6-((3-(1,1,1,5,5,5-hexamethyl-3-((trimethylsilyl)oxy)trisiloxan-3-yl)propyl)amino)-N,N-dimethyl-6-oxohexan-1-aminium iodide, having the following formula:

Surfactant 3

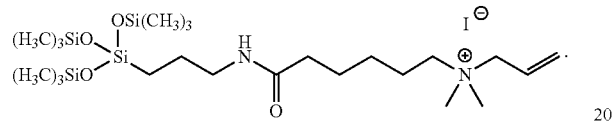

A further specific compound provided by the present disclosure and referred to herein as Surfactant 4 is 6-((3-(1,1,1,5,5,5-hexamethyl-3-((trimethylsilyl)oxy)trisiloxan-3-yl)propyl)amino)-N,N-dimethyl-6-oxo-N-(prop-2-yn-1-yl)hexan-1-aminium bromide, having the following formula:

Surfactant 4

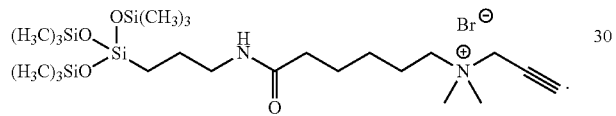

A further specific compound provided by the present disclosure and referred to herein as Surfactant 5 is 6-((3-(1,1,1,5,5,5-hexamethyl-3-((trimethylsilyl)oxy)trisiloxan-3-yl)propyl)amino)-N-(2-(2-methoxyethoxy)ethyl)-N,N-dimethyl-6-oxohexan-1-aminium bromide, having the following formula:

Surfactant 5

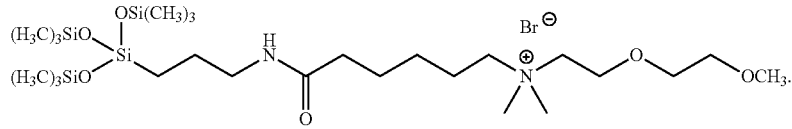

A further specific compound provided by the present disclosure and referred to herein as Surfactant 6 is N-(3-(diethoxyphosphoryl)propyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

Surfactant 6

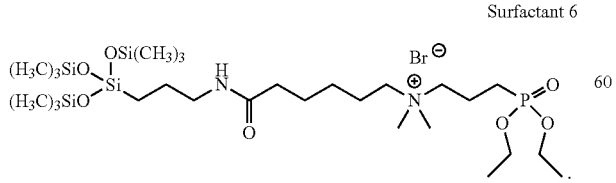

A further specific compound provided by the present disclosure and referred to herein as Surfactant 7 is 6-((3-(1,1,1,5,5,5-hexamethyl-3-((trimethylsilyl)oxy)trisiloxan-3-yl)propyl)amino)-N-(3-hydroxypropyl)-N,N-dimethyl-6-oxohexan-1-aminium iodide, having the following formula:

Surfactant 7

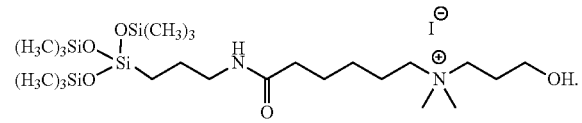

A further specific compound provided by the present disclosure and referred to herein as Surfactant 8 is 6-((3-(1,1,1,5,5,5-hexamethyl-3-((trimethylsilyl)oxy)trisiloxan-3-yl)propyl)amino)-N-(2-hydroxyethyl)-N,N-dimethyl-6-oxohexan-1-aminium iodide, having the following formula:

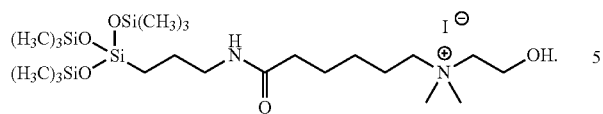

Surfactant 8

A further specific compound provided by the present disclosure and referred to herein as Surfactant 9a is N-(5-carboxypentyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

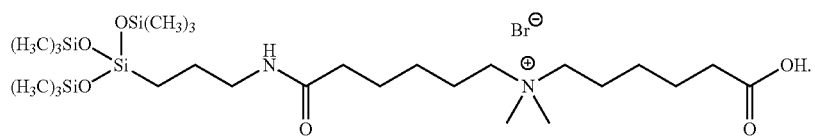

Surfactant 9a

A further specific compound provided by the present disclosure and referred to herein as Surfactant 9b is N-(carboxymethyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

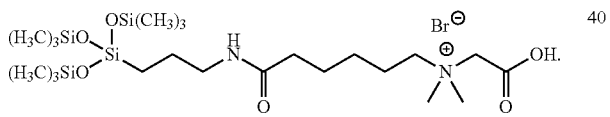

Surfactant 9b

A further specific compound provided by the present disclosure and referred to herein as Surfactant 10 is $N^1,N^3$-bis(6-((3-(1,1,1,5,5,5-hexamethyl-3-((trimethylsilyl)oxy)trisiloxan-3-yl)propyl)amino)-6-oxohexyl)-$N^1,N^1,N^3,N^3$-tetramethylpropane-1,3-diaminium dibromide, having the formula:

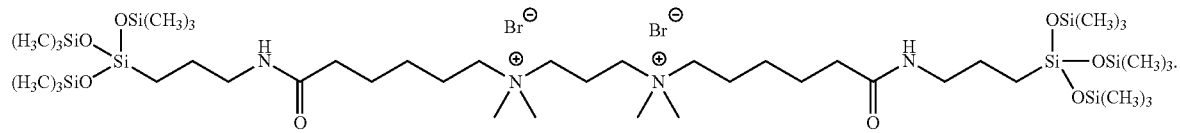

Surfactant 10

A further group of specific compounds provided by the present disclosure and referred to herein as Surfactant 11 have the general formula:

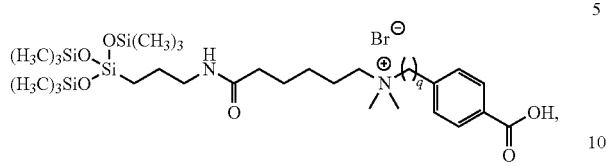

wherein q may be an integer from 1 to 10.

A further specific compound provided by the present disclosure and referred to herein as Surfactant 11a is N-(4-(4-carboxyphenyl)butyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the formula:

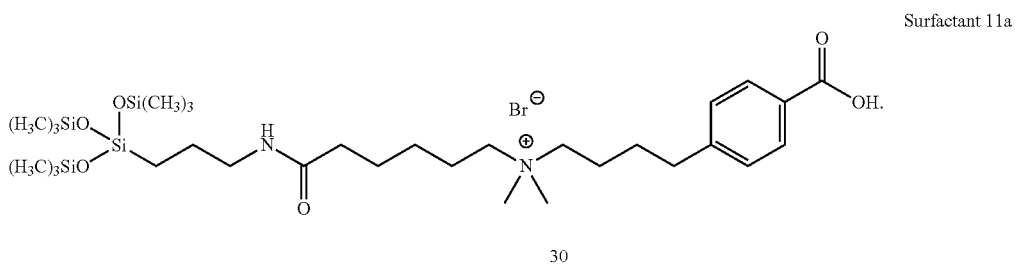

A further specific compound provided by the present disclosure and referred to herein as Surfactant 11 b is N-(4-(4-carboxyphenyl)butyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the formula:

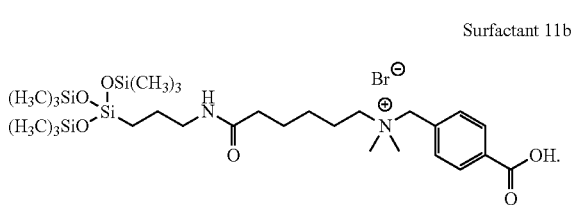

The above mentioned and other features of the disclosure, and the manner of attaining them, will become more apparent and will be better understood by reference to the following description of embodiments taken in conjunction with the accompanying drawings.

Figure 1:
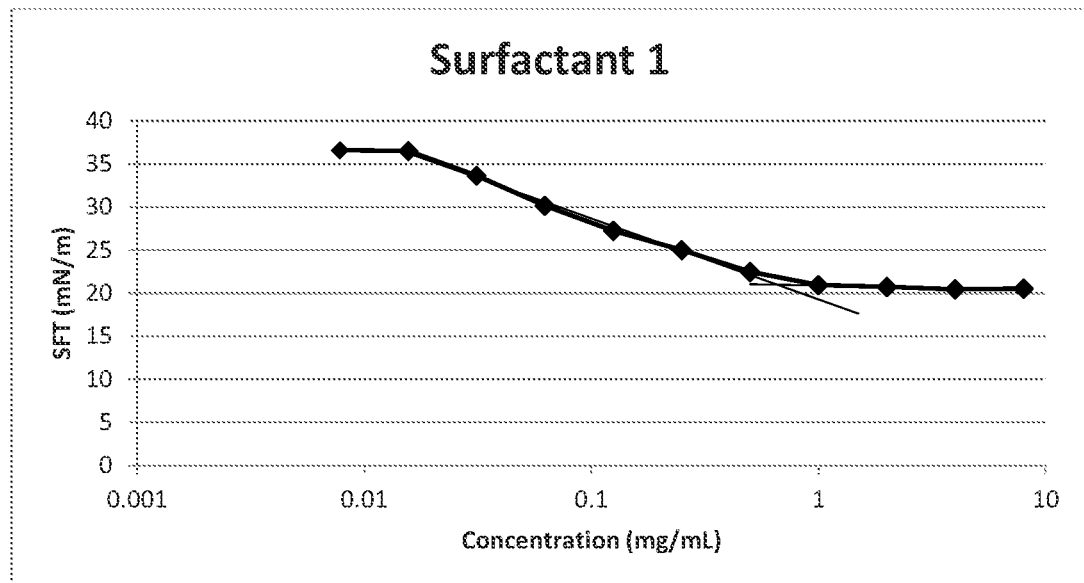
FIG. 1 shows a plot of surface tension versus concentration for Surfactant 2 as described in Example 2b.

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

As used herein, the word "alkyl" means any saturated carbon chain, which may be a straight or branched chain, and may be substituted at any point along the carbon chain.

As used herein, the phrase "surface-active" means that the associated compound is able to lower the surface tension of the medium in which it is dissolved, and/or the interfacial tension with other phases, and, accordingly, may be adsorbed at the liquid/vapor and/or other interfaces. The term "surfactant" may be applied to such a compound.

With respect terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example. In the event it is determined that individuals having ordinary skill in the relevant arts would not readily ascertain values for such reasonably small differences, the terms "about" and "approximately" can be understood to mean plus or minus 10% of the stated value.

The present disclosure provides siloxane derivatives of amino acids. The amino acids may be naturally occurring or synthetic, or they may be obtained from ring-opening reactions of lactams, such as caprolactam. The compounds of the present disclosure have been shown to have surface-active properties, and may be used as surfactants and wetting agents, for example. In particular, the present disclosure provides compounds of Formula I, shown below:

The present disclosure provides compounds of Formula I, below:

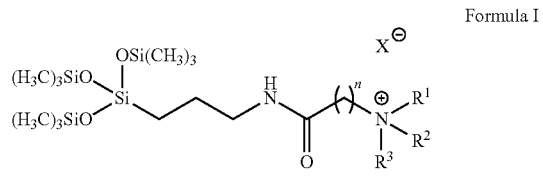

Formula I wherein $R^1$ and $R^2$ may be the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

$R^3$ may be selected from the group consisting of alkenyl, alkynyl, ester, alcohol, aryl alkyl, alkoxy alkyl ether, $C_3$-$C_8$ carboxylic acid, alkyl phosphate, or a $C_1$-$C_6$ linker attached to a second molecule of Formula I, wherein the second molecule is the same or different;

n may be an integer from 1 to 12; and

X may be selected from the group consisting of chloride, bromide, and iodide.

Specifically, $R^3$ may be $C_2$-$C_{10}$ alkenyl, $C_2$-$C_{10}$ alkynyl, $C_2$-$C_{12}$ ester, $C_1$-$C_{10}$ hydroxyl, benzyl, $C_2$-$C_{12}$ alkoxy alkyl ether, alkyl phosphate, $C_3$-$C_8$ carboxylic acid, $C_1$-$C_{10}$ alkyl benzoic acid, or a three-carbon linker attached to a second molecule of Formula I, wherein the second molecule is the same.

More specifically, $R^3$ may be selected from the group consisting of the formulas below:

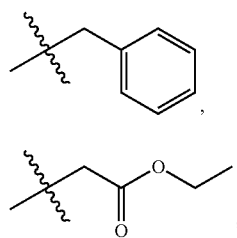

$R^{3.1}$

$R^{3.2}$

$R^{3.3}$

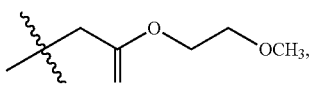

$R^{3.4}$

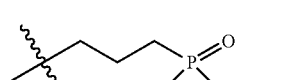

$R^{3.5}$

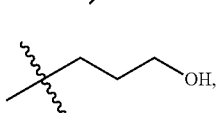

$R^{3.6}$

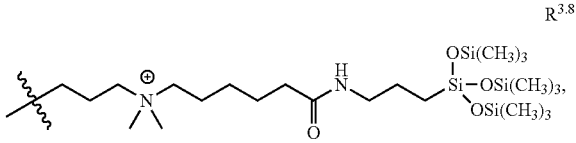

$R^{3.7}$

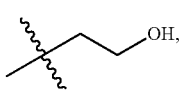

$R^{3.8}$

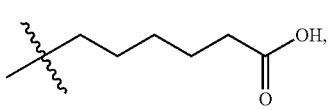

$R^{3.9}$

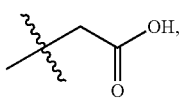

$R^{3.10a}$

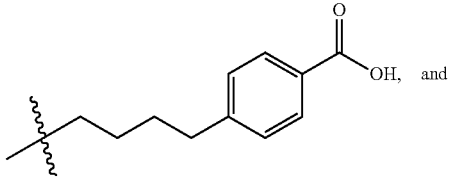

$R^{3.10b}$ $R^{3.11a}$

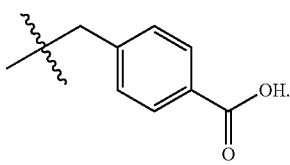

and $R^{3.11b}$

Further compounds provided by the present disclosure are those compounds of Formula I wherein $R^1$ and $R^2$ are methyl.

Other compounds provided by the present disclosure are compounds of Formula I, wherein n is 5.

As used herein, the phrase "n may be an integer from 1 to 12" means that n may be equal to 1, 2, 3, 4, 5, 6, 7, 8, 9, 10, 11, and/or 12 or within any range including any two of the foregoing as endpoints.

As used herein, the phrase "$C_1$-$C_6$ alkyl" means a straight chain or branched alkyl group containing 1, 2, 3, 4, 5, and/or 6 carbons or within any range including any two of the foregoing as endpoints.

As used herein, the phrase "$C_1$-$C_6$ linker" means a straight chain or branched alkyl chain containing 1, 2, 3, 4, 5, and/or 6 carbons or within any range including any two of the foregoing as endpoints.

As used herein, the phrase "$C_2$-$C_{10}$ alkenyl" means a straight chain or branched alkenyl group containing 2, 3, 4, 5, 6, 7, 8, 9, and/or 10 carbons or within any range including any two of the foregoing as endpoints.

As used herein, the phrase "$C_2$-$C_{10}$ alkynyl" means a straight chain or branched alkynyl group containing 2, 3, 4, 5, 6, 7, 8, 9, and/or 10 carbons or within any range including any two of the foregoing as endpoints.

As used herein, the phrase "$C_2$-$C_{12}$ ester" means a straight chain or branched ester group having a total of 2, 3, 4, 5, 6, 7, 8, 9, 10, 11 and/or 12 carbons or within any range including any two of the foregoing as endpoints.

As used herein, the phrase "$C_2$-$C_{12}$ alkoxy alkyl ether" means a straight chain or branched alkoxy alkyl ether group having a total of 2, 3, 4, 5, 6, 7, 8, 9, 10, 11 and/or 12 carbons or within any range including any two of the foregoing as endpoints.

As used herein, the phrase "$C_1$-$C_{10}$ hydroxyl" means a hydroxyl attached to a straight chain or branched alkyl group containing 1, 2, 3, 4, 5, 6, 7, 8, 9, and/or 10 carbons or within any range including any two of the foregoing as endpoints.

As used herein, the phrase "$C_3$-$C_8$ carboxylic acid" means a carboxylic acid group attached to a straight chain or branched alkyl group with a containing 3, 4, 5, 6, 7, and/or 8, carbons or within any range including any two of the foregoing as endpoints.

As used herein, the phrase "$C_1$-$C_{10}$ alkyl benzoic acid" means a benzoic acid group attached to a straight chain or branched alkyl group containing 1, 2, 3, 4, 5, 6, 7, 8, 9, and/or 10 carbons or within any range including any two of the foregoing as endpoints.

As used herein, the phrase "n and z may be selected independently from any integer from 1 to 12" means that n and z may be independently 1, 2, 3, 4, 5, 6, 7, 8, 9, 10, 11, and/or 12 or within any range including any two of the foregoing as endpoints.

As used herein, the phrase "m may be any integer from 1 to 12" means that m may be 1, 2, 3, 4, 5, 6, 7, 8, 9, 10, 11, and/or 12 or within any range including any two of the foregoing as endpoints.

As used herein, the phrase "q may be any integer from 1 to 10" means that q may be 1, 2, 3, 4, 5, 6, 7, 8, 9, and/or 10 or within any range including any two of the foregoing as endpoints.

One specific compound provided by the present disclosure and referred to herein as Surfactant 1 is N-benzyl-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

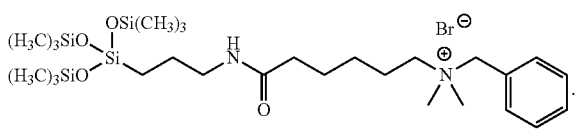

A second specific compound provided by the present disclosure and referred to herein as Surfactant 2 is N-(2-ethoxy-2-oxoethyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

A third specific compound provided by the present disclosure and referred to herein as Surfactant 3 is N-allyl-6-((3-(1,1,1,5,5,5-hexamethyl-3-((trimethylsilyl)oxy)trisiloxan-3-yl)propyl)amino)-N,N-dimethyl-6-oxohexan-1-aminium iodide, having the following formula:

A fourth specific compound provided by the present disclosure and referred to herein as Surfactant 4 is 6-((3-(1,1,1,5,5,5-hexamethyl-3-((trimethylsilyl)oxy)trisiloxan-3-yl)propyl)amino)-N,N-dimethyl-6-oxo-N-(prop-2-yn-1-yl)hexan-1-aminium bromide, having the following formula:

A fifth specific compound provided by the present disclosure and referred to herein as Surfactant 5 is 6-((3-(1,1,1,5,5,5-hexamethyl-3-((trimethylsilyl)oxy)trisiloxan-3-yl)propyl)amino)-N-(2-(2-methoxyethoxy)ethyl)-N,N-dimethyl-6-oxohexan-1-aminium bromide, having the following formula:

A sixth specific compound provided by the present disclosure and referred to herein as Surfactant 6 is N-(3-(diethoxyphosphoryl)propyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

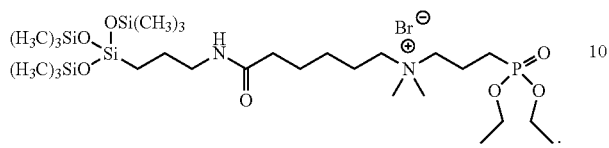

A seventh specific compound provided by the present disclosure and referred to herein as Surfactant 7 is 6-((3-(1,1,1,5,5,5-hexamethyl-3-((trimethylsilyl)oxy)trisiloxan-3-yl)propyl)amino)-N-(3-hydroxypropyl)-N,N-dimethyl-6-oxohexan-1-aminium iodide, having the following formula:

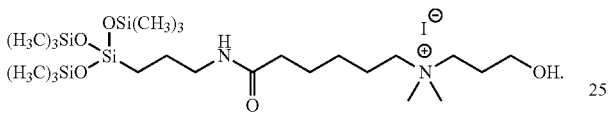

An eighth specific compound provided by the present disclosure and referred to herein as Surfactant 8 is 6-((3-(1,1,1,5,5,5-hexamethyl-3-((trimethylsilyl)oxy)trisiloxan-3-yl)propyl)amino)-N-(2-hydroxyethyl)-N,N-dimethyl-6-oxohexan-1-aminium iodide, having the following formula:

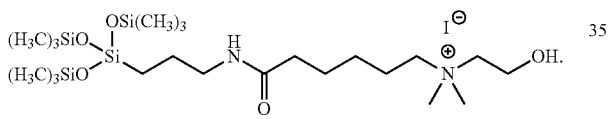

A ninth specific compound provided by the present disclosure and referred to herein as Surfactant 9a is N-(5-carboxypentyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

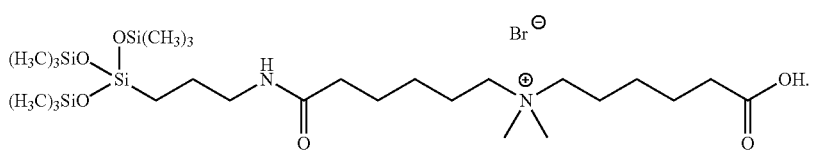

A tenth specific compound provided by the present disclosure and referred to herein as Surfactant 9b is N-(carboxymethyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

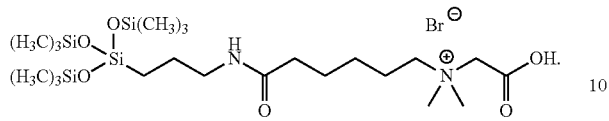

An eleventh specific compound provided by the present disclosure and referred to herein as Surfactant 10 is $N^1,N^3$-bis(6-((3-(1,1,1,5,5,5-hexamethyl-3-((trimethylsilyl)oxy)trisiloxan-3-yl)propyl)amino)-6-oxohexyl)-$N^1,N^1,N^3,N^3$-tetramethylpropane-1,3-diaminium dibromide, having the formula:

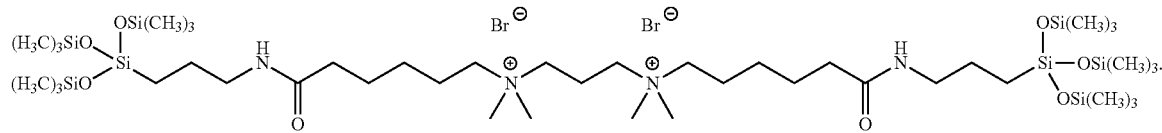

A further group of specific compounds provided by the present disclosure and referred to herein as Surfactant 11 have the general formula:

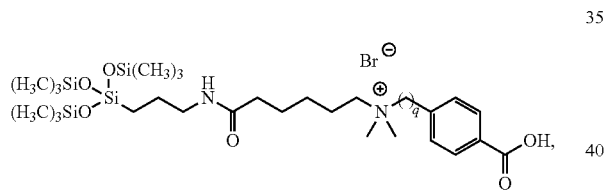

wherein q may be an integer from 1 to 10.

A twelfth specific compound provided by the present disclosure and referred to herein as Surfactant 11a is N-(4-(4-carboxyphenyl)butyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the formula:

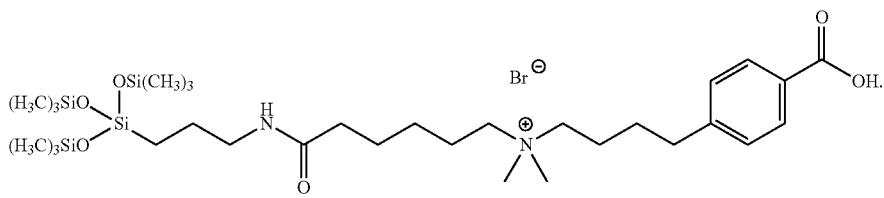

A thirteenth specific compound provided by the present disclosure and referred to herein as Surfactant 11 b is N-(4-(4-carboxyphenyl)butyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the formula:

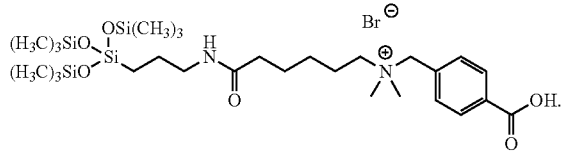

These compounds may be synthesized by various methods. One such method includes reacting an amino acid, such as an N-alkylated or N-acylated amino acid, with a siloxane to convert the amino acid C-terminus to the desired siloxane derivative. The amino acid N-terminus may be further alkylated to yield a quaternary amine, for example.

The amino acid may be naturally occurring or synthetic or may be derived from a ring opening reaction of a lactam, such as caprolactam. The ring-opening reaction may be either an acid or alkali catalyzed reaction, and an example of an acid catalyzed reaction is shown below in Scheme 1.

SCHEME 1

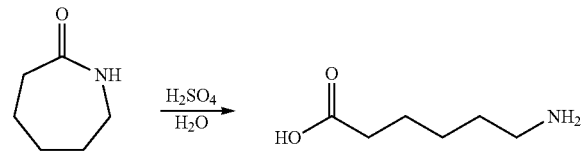

The amino acid may have as few as 1 or as many as 12 carbons between the N- and C-termini, such as 1, 2, 3, 4, 5, 6, 7, 8, 9, 10, 11, or 12 carbons. The alkyl chain may be branched or straight. The alkyl chain may be interrupted with nitrogen, oxygen, or sulfur. The alkyl chain may be further substituted with one or more substituents selected from the group consisting of hydroxyl, amino, amido, sulfonyl, sulfonate, carboxyl, and carboxylate. The N-terminal nitrogen may be acylated or alkylated with one or more alkyl groups. For example, the amino acid may be 6-(dimethylamino)hexanoic acid.

The siloxane may be substituted with one or more alkoxy groups, such as methoxy, ethoxy, isopropoxy, tertiary butoxy, and others. The siloxane may be further substituted with one or more alkyl groups, such as propyl, wherein the alkyl group may yet be further substituted with an appropriate functional group to permit coupling of the siloxane to the amino acid, such as a nitrogen. For example, the siloxane may be 3-aminopropyltris(trimethylsiloxy)silane.

The siloxane derivative of the amino acid may be synthesized as shown below in Scheme 2. As shown, 6-aminohexanoic acid may be alkylated at the N-terminus by treatment with formaldehyde in formic acid at reflux to give 6-(dimethylamino)hexanoic acid. The free carboxylic acid is then coupled to 3-aminopropyl(trismethylsiloxy)silane in refluxing toluene to give the desired siloxane derivative.

SCHEME 2

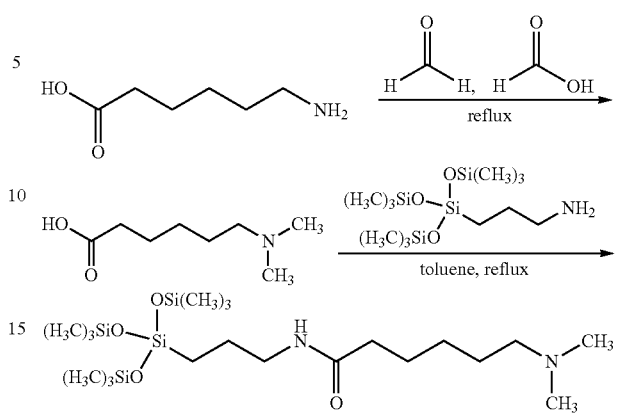

The N-terminal nitrogen may be further derivatized to modify or improve water solubility and surface-active properties. A sample synthetic scheme is shown below in Scheme 3, in which the N-terminal nitrogen is alkylated to provide a quaternary amine.

SCHEME 3

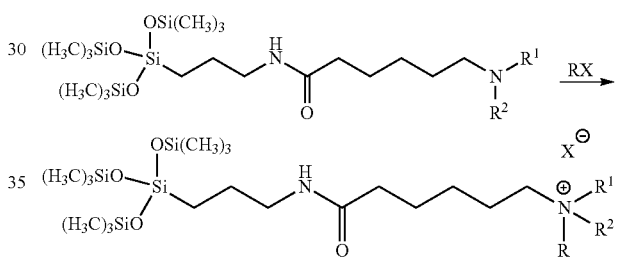

Suitable alkylating agents may include benzyl bromide, ethyl bromoacetate, allyl iodide, propargyl bromide, 1-bromo-2-(2-methoxyethoxy)ethane, bromo phosphonate, 3-iodopropanol, 3-bromopropanol, 2-iodoethanol, 2-bromoethanol, 6-bromohexanoic acid, 4-(4-bromobutyl)benzoic acid, and 4-(bromomethyl)benzoic acid, for example. Two molecules of Formula I may be linked by treating the N-terminal nitrogen with a difunctional alkylating agent, such as 1,3-dibromopropane for example.

The compounds of the present disclosure demonstrate surface-active properties. These properties may be measured and described by various methods. One method by which surfactants may be described is by the molecule's critical micelle concentration (CMC). CMC may be defined as the concentration of a surfactant at which micelles form, and above which all additional surfactant is incorporated into micelles.

For example, the compounds of formula (I) may have a critical micelle concentration (CMC) from about 0.0010 mmol to about 10.0000 mmol, or from 0.0500 mmol to about 5.0000 mmol, or from about 0.0500 mmol to about 2.0000 mmol or from about 0.0600 mmol or about 1.3600 mmol, or within any range defined between any two of the foregoing values as endpoints.

As surfactant concentration increases, surface tension decreases. Once the surface is completely overlaid with surfactant molecules, micelles begin to form. This point represents the CMC, as well as the minimum surface tension. Further addition of surfactant will not further affect the surface tension. CMC may therefore be measured by observing the change in surface tension as a function of surfactant concentration. One such method for measuring this value is the Wilhemy plate method. A Wilhelmy plate is usually a thin iridium-platinum plate attached to a balance by a wire and placed perpendicularly to the air-liquid interface. The balance is used to measure the force exerted on the plate by wetting. This value is then used to calculate the surface tension (γ) according to Equation 1:

$$\gamma = F/l \cos \theta: \quad \text{Equation 1}$$

wherein l is equal to the wetted perimeter (2w+2d, in which w and d are the plate thickness and width, respectively) and cos θ, the contact angle between the liquid and the plate, is assumed to be 0 in the absence of an extant literature value.

Another parameter used to assess the performance of surfactants is dynamic surface tension. The dynamic surface tension is the value of the surface tension for a particular surface or interface age. In the case of liquids with added surfactants, this can differ from the equilibrium value. Immediately after a surface is produced, the surface tension is equal to that of the pure liquid. As described above, surfactants reduce surface tension; therefore, the surface tension drops until an equilibrium value is reached. The time required for equilibrium to be reached depends on the diffusion rate and the adsorption rate of the surfactant.

A plateau value of minimum surface tension that can be reached the compounds of formula (I) may be from about 10.00 mN/m to about 28.00 mN/m, or about 20.00 mN/m to about 25 mN/m, or from about 20.00 mN/m to about 23.00 mN/mm or within any range defined between any two of the foregoing values as endpoints.

One method by which dynamic surface tension is measured relies upon a bubble pressure tensiometer. This device measures the maximum internal pressure of a gas bubble that is formed in a liquid by means of a capillary. The measured value corresponds to the surface tension at a certain surface age, the time from the start of the bubble formation to the occurrence of the pressure maximum. The dependence of surface tension on surface age can be measured by varying the speed at which bubbles are produced.

Surface-active compounds may also be assessed by their wetting ability on solid substrates as measured by the contact angle. When a liquid droplet comes in contact with a solid surface in a third medium, such as air, a three-phase line forms among the liquid, the gas and the solid. The angle between the surface tension unit vector, acting at the three-phase line and tangent at the liquid droplet, and the surface is described as the contact angle. The contact angle (also known as wetting angle) is a measure of the wettability of a solid by a liquid. In the case of complete wetting, the liquid is completely spread over the solid and the contact angle is 0°. Wetting properties are typically measured for a given compound at the concentration of 1-10×CMC; however, it is not a property that is concentration-dependent. Therefore, measurements of wetting properties can be measured at concentrations that are higher or lower.

In one method, an optical contact angle goniometer may be used to measure the contact angle. This device uses a digital camera and software to extract the contact angle by analyzing the contour shape of a sessile droplet of liquid on a surface.

Potential applications for the surface-active compounds of the present disclosure include formulations for use as shampoos, hair conditioners, detergents, spot-free rinsing solutions, floor and carpet cleaners, cleaning agents for graffiti removal, wetting agents for crop protection, adjuvants for crop protection, and wetting agents for aerosol spray coatings.

It will be understood by one skilled in the art that small differences between compounds may lead to substantially different surfactant properties, such that different compounds may be used with different substrates, in different applications. It will be further understood by one skilled in the art that surfactant properties may not be predictable on the basis of chemical structure, as further demonstrated below. For example, Surfactants 9a and 9b, which differ only in the number of methylene groups in $R^3$, demonstrate different surfactant properties. Surprisingly, Surfactant 9b demonstrates excellent activity, as described further below, while Surfactant 9a demonstrates inferior surfactant properties.

The following non-limiting embodiments are provided to demonstrate the different properties of the different surfactants. In Table 1 below, short names for the surfactants are correlated with their corresponding chemical structures.

TABLE 1

| Surfactant | Formula & Name |
|---|---|
| Surfactant 1 | N-benzyl-6-((3-(1,1,1,5,5,5-hexamethyl-3-((trimethylsilyl)oxy)trisiloxan-3-yl)propyl)amino)-N,N-dimethyl-6-oxohexan-1-aminium bromide |
| Surfactant 2 | N-(2-ethoxy-2-oxoethyl)-6-((3-(1,1,1,5,5,5-hexamethyl-3-((trimethylsilyl)oxy)trisiloxan-3-yl)propyl)amino)-N,N- |

TABLE 1-continued

| Surfactant | Formula & Name |
|---|---|
| | dimethyl-6-oxohexan-1-aminium bromide |
| Surfactant 3 | 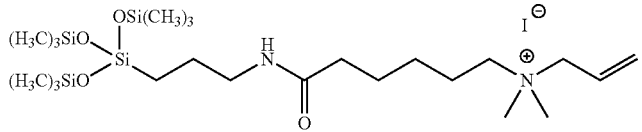<br>N-allyl-6-((3-(1,1,1,5,5,5-hexamethyl-3-((trimethylsilyl)oxy)trisiloxan-3-yl)propyl)amino)-N,N-dimethyl-6-oxohexan-1-aminium iodide |
| Surfactant 4 | 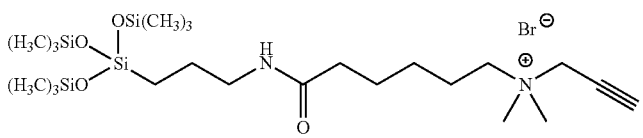<br>6-((3-(1,1,1,5,5,5-hexamethyl-3-((trimethylsilyl)oxy)trisiloxan-3-yl)propyl)amino)-N,N-dimethyl-6-oxo-N-(prop-2-yn-1-yl)hexan-1-aminium bromide |
| Surfactant 5 | 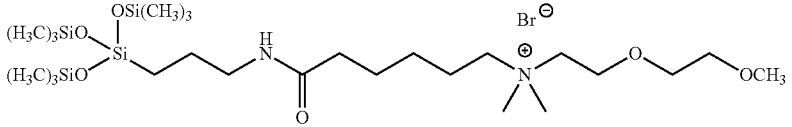<br>6-((3-(1,1,1,5,5,5-hexamethyl-3-((trimethylsilyl)oxy)trisiloxan-3-yl)propyl)amino)-N-(2-(2-methoxyethoxy)ethyl)-N, N-dimethyl-6-oxohexan-1-aminium bromide |
| Surfactant 6 | 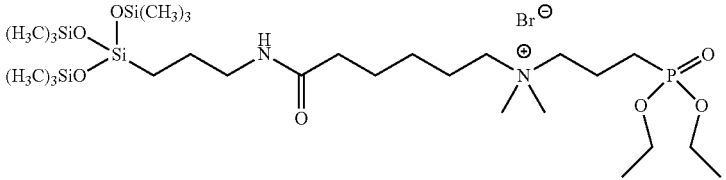<br>N-(3-(diethoxyphosphoryl)propyl)-6-((3-(1,1,1,5,5,5-hexamethyl-3-((trimethylsilyl)oxy)trisiloxan-3-yl)propyl)amino)-N, N-dimethyl-6-oxohexan-1-aminium bromide |
| Surfactant 7 | 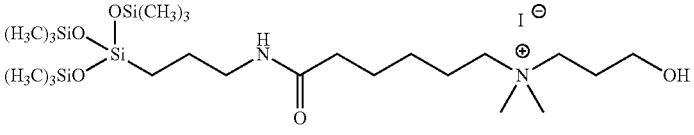<br>6-((3-(1,1,1,5,5,5-hexamethyl-3-((trimethylsilyl)oxy)trisiloxan-3-yl)propyl)amino)-N-(3-hydroxypropyl)-N, N-dimethyl-6-oxohexan-1-aminium iodide |
| Surfactant 8 | 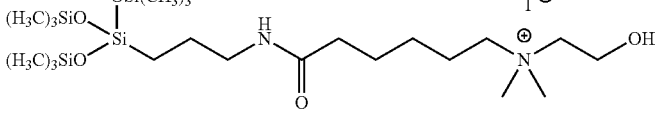<br>6-((3-(1,1,1,5,5,5-hexamethyl-3-((trimethylsilyl)oxy)trisiloxan-3-yl)propyl)amino)-N-(2-hydroxyethyl)-N,N-dimethyl-6-oxohexan-1-aminium iodide |

TABLE 1-continued

| Surfactant | Formula & Name |
|---|---|
| Surfactant 9a | 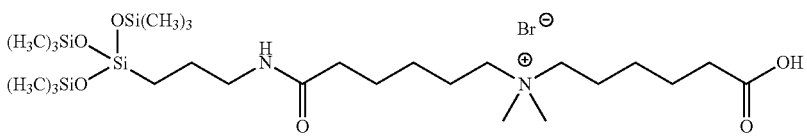<br>N-(5-carboxypentyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide |
| Surfactant 9b | 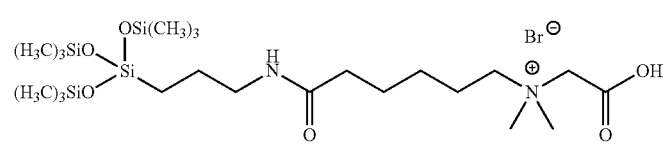<br>N-(carboxymethyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide |
| Surfactant 10 | 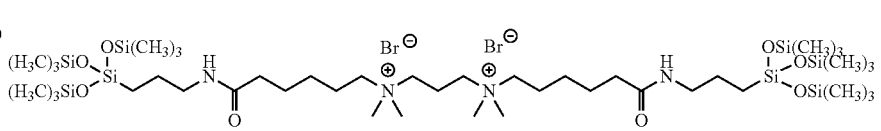<br>$N^1$, $N^3$-bis(6-((3-(1,1,1,5,5,5-hexamethyl-3-((trimethylsilyl)oxy)trisiloxan-3-yl)propyl)amino)-6-oxohexyl)-$N^1$, $N^1$, $N^3$, $N^3$-tetramethylpropane-1,3-diaminium dibromide |
| Surfactant 11 | 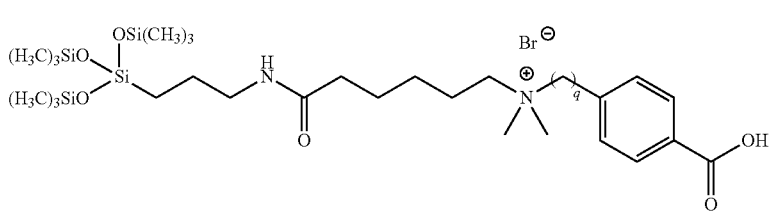 |
| Surfactant 11a | 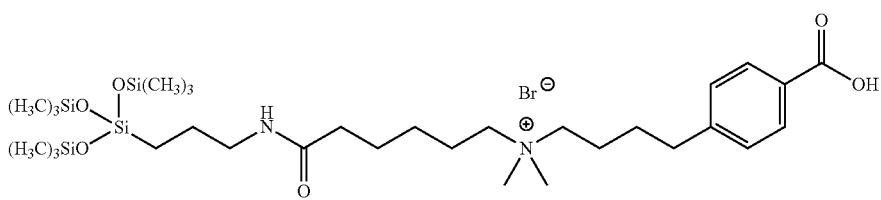<br>N-(4-(4-carboxyphenyl)butyl)-6-((3-(1,1,1,5,5,5-hexamethyl-3-((trimethylsilyl)oxy)trisiloxan-3-yl)propyl)amino)-N, N-dimethyl-6-oxohexan-1-aminium bromide |
| Surfactant 11b | 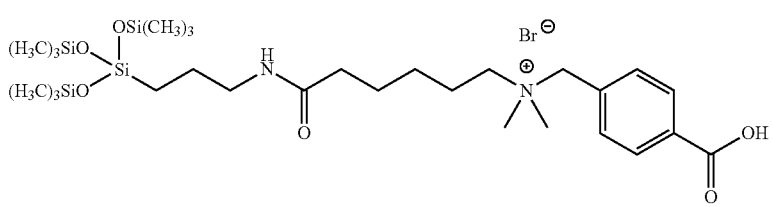<br>N-(4-carboxybenzyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide |

These compounds may be effective as surface-active agents, useful for wetting or foaming agents, dispersants, emulsifiers, and detergents, among other applications.

The amount of the compounds disclosed herein used in a formulation may be as low as about 0.001 wt. %, about 0.05 wt. %, about 0.1 wt. %, about 0.5 wt. %, about 1 wt. %, about 2 wt. %, or about 5 wt. %, or as high as about 8 wt. %, about 10 wt. %, about 15 wt. %, about 20 wt. %, or about 25 wt. %, or within any range defined between any two of the foregoing values.

EXAMPLES

Nuclear magnetic resonance (NMR) spectroscopy was performed on a Bruker 500 MHz spectrometer. The critical micelle concentration (CMC) was determined by the Wilhelmy plate method at 23° C. with a tensiometer (DCAT 11, DataPhysics Instruments GmbH) equipped with a Pt—Ir plate. Dynamic surface tension was determined with a bubble pressure tensiometer (Krüss BP100, Krüss GmbH), at 23° C. Contact angle was determined with the optical contact angle goniometer (OCA 15 Pro, DataPhysics GmbH) equipped with a digital camera.

Example 1: Synthesis of 6-(dimethylamino)-N-(3-(1,1,1,5,5,5-hexamethyl-3-((trimethylsilyl)oxy)trisiloxan-3-yl)propyl)hexanamide 6-(Dimethylamino)hexanoic acid (2.00 g, 12.56 mmol, 1 equiv.) was dissolved in toluene (50 mL) in a 100 mL round bottom boiling flask equipped with a Dean Stark trap, then 3-aminopropyltris(trimethylsiloxy)silane (5.48 mL, 13.81 mmol, 1.1 equiv.) was added. The reaction vessel was heated, and the reaction refluxed for 24 hours until no more water separated in the Dean Stark tube. The solvent was removed under vacuum to give the desired siloxane derivative as a yellow oil in 94% yield. 1H NMR (500 MHz, DMSO) δ: 0.09 (s, 27H), 0.28-0.31 (m, 2H), 1.12-1.26 (m, 2H), 1.27-1.30 (m, 4H), 1.38-1.41 (m, 2H), 1.94 (t, J=7.3 Hz, 2H), 2.00 (s, 6H), 2.06-2.03 (m, 2H), 2.89 (dd, J=12.9, 6.8 Hz, 2H).

Example 2a: Synthesis of N-benzyl-6-((3-(1,1,1,5,5,5-hexamethyl-3-((trimethylsilyl)oxy)trisiloxan-3-yl)propyl)amino)-N,N-dimethyl-6-oxohexan-1-aminium bromide (Surfactant 1)

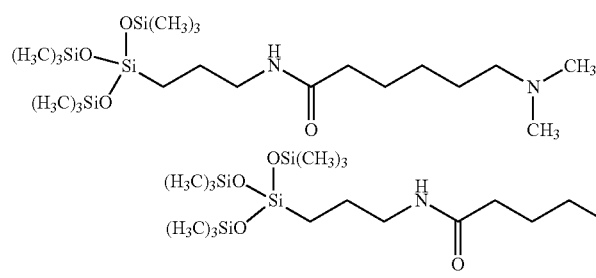

The siloxane derivative described in Example 1 (1 g, 2.02 mmol) was dissolved in dimethylformamide (DMF) (15 mL). Benzyl bromide (518 mg, 3.03 mmol) was added, and the mixture was heated to 70° C. for 12 hours. The solvent was removed under vacuum and the crude product was washed twice with acetone to remove excess benzyl bromide and give Surfactant 1 as a yellow solid (1.1 g).

Example 2b: Determination of Physical Properties of Surfactant 1

The critical micelle concentration (CMC) for Surfactant 1 was measured. From the surface tension change with concentration in water, the CMC was determined to be about 9.883 mmol at pH 8. The plateau value of minimum surface tension that can be reached by this surfactant was around 20.67 mN/m, indicating that the surfactant has outstanding interfacial activity. These results are plotted as surface tension versus concentration in FIG. 1.

Example 3a: Synthesis of N-(2-ethoxy-2-oxoethyl)-6-((3-(1,1,1,5,5,5-hexamethyl-3-((trimethylsilyl)oxy)trisiloxan-3-yl)propyl)amino)-N,N-dimethyl-6-oxo-hexan-1-aminium bromide (Surfactant 2)

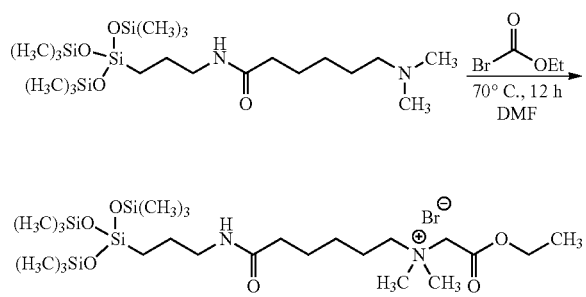

The siloxane derivative described in Example 1 (1 g, 2.02 mmol) was dissolved in DMF (15 mL), and ethyl bromoacetate (0.25 mL, 2.4 mmol) was added. The mixture was stirred for 12 hours at 70° C. The solvent was removed under vacuum, and the crude product was washed twice with hexane two times to give Surfactant 2 as a brown liquid (900 mg).

Example 3b: Determination of Physical Properties of Surfactant 2

Figure 2:
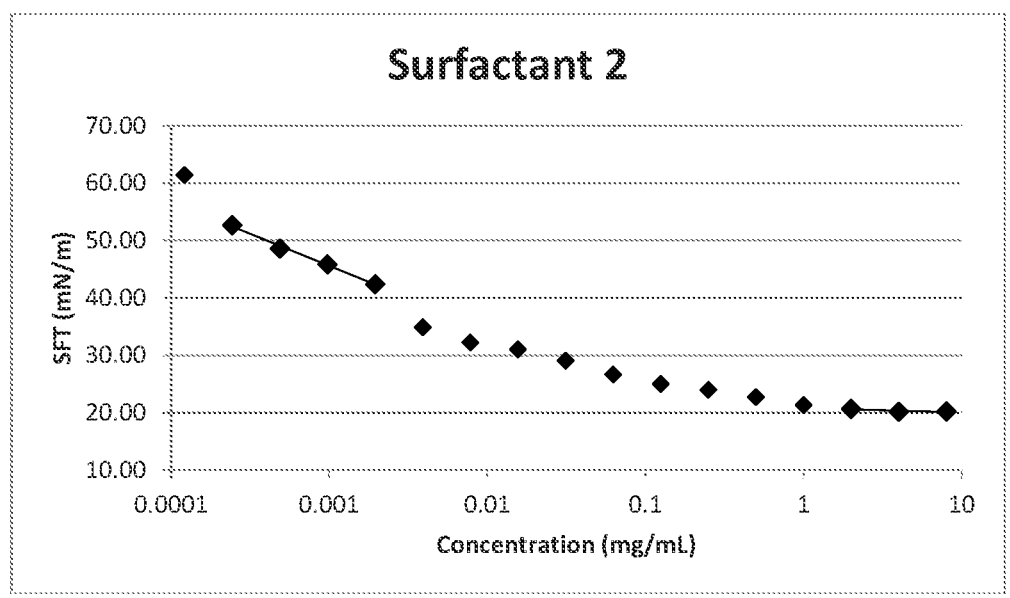
FIG. 2 shows a plot of surface tension versus concentration for Surfactant 2 as described in Example 3b.

The critical micelle concentration (CMC) for Surfactant 2 was measured. From the surface tension change with concentration in water, the CMC was determined to be about 0.2171 mmol. The plateau value of minimum surface tension that can be reached by this surfactant was around 20.36 mN/m, indicating that the surfactant has outstanding interfacial activity. These results are plotted as surface tension versus concentration in FIG. 2.

Example 4a: Synthesis of N-allyl-6-((3-(1,1,1,5,5,5-hexamethyl-3-((trimethylsilyl)oxy)trisiloxan-3-yl)propyl)amino)-N,N-dimethyl-6-oxohexan-1-aminium iodide (Surfactant 3)

Example 5a: Synthesis of 6-((3-(1,1,1,5,5,5-hexamethyl-3-((trimethylsilyl)oxy)trisiloxan-3-yl)propyl)amino)-N,N-dimethyl-6-oxo-N-(prop-2-yn-1-yl)hexan-1-aminium bromide (Surfactant 4)

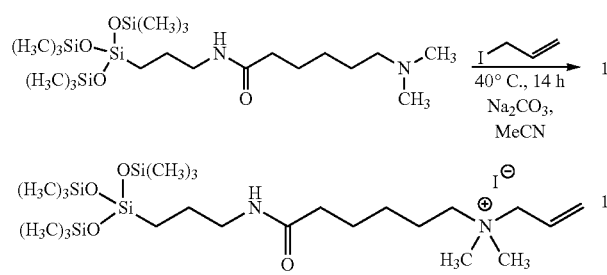

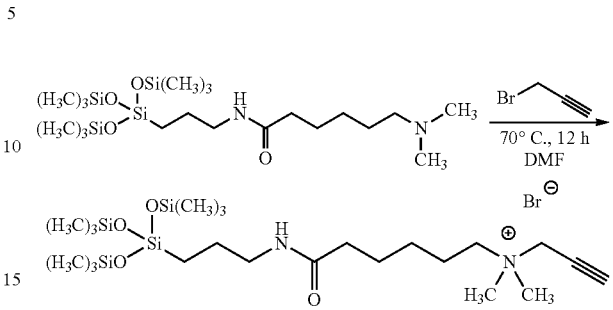

The siloxane derivative described in Example 1 (1.00 g, 2.02 mmol) was added to acetonitrile (10 mL), followed by sodium carbonate (0.26 g), then allyl iodide (674 mg). The reaction was refluxed for 14 hours at 40° C. Residual sodium carbonate was removed via filtration and the filtrate was concentrated. The crude product was washed twice with hexane to remove excess allyl iodide to give Surfactant 3 as a brown liquid (850 mg).

Example 4b: Determination of Physical Properties of Surfactant 3

Figure 3:
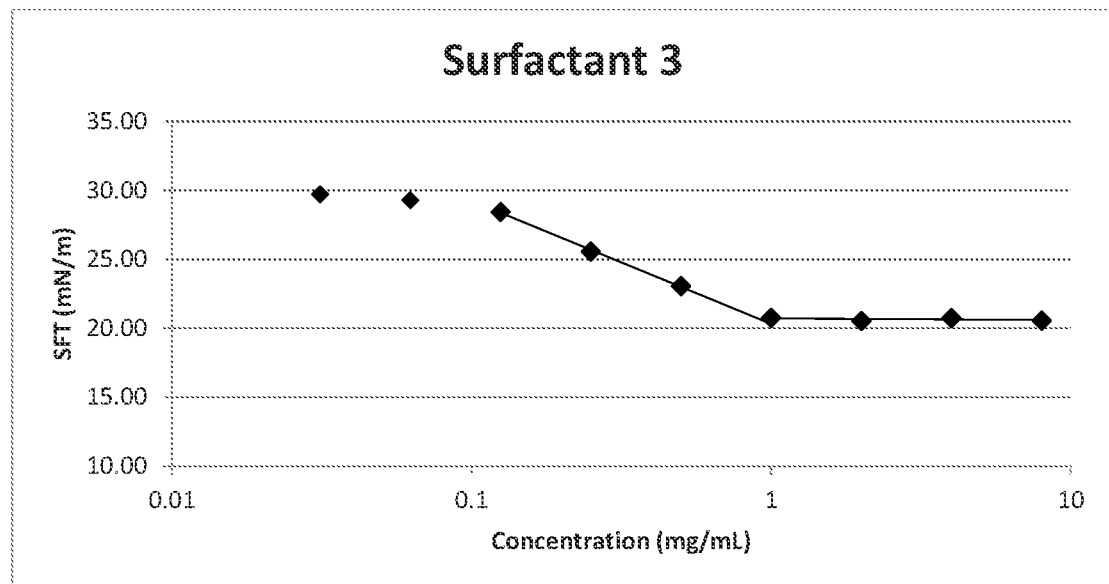
FIG. 3 shows a plot of surface tension versus concentration for Surfactant 3 as described in Example 4b.

The critical micelle concentration (CMC) for Surfactant 3 was measured. From the surface tension change with concentration in water, the CMC was determined to be about 1.3599 mmol. The plateau value of minimum surface tension that can be reached by this surfactant was about 20.67 mN/m, indicating that the surfactant has outstanding interfacial activity. These results are plotted as surface tension versus concentration in FIG. 3.

The siloxane derivative described in Example 1 (1.00 g, 2.02 mmol) was dissolved in dimethylformamide (DMF) (15 mL). Propargyl bromide (674 mg, 2.4 mmol) was added, and the mixture was stirred for 12 hours at 70° C. The solvent was removed under vacuum, and the crude product was washed twice with hexanes to give Surfactant 4 as a brown liquid (850 mg).

Example 5b: Determination of Physical Properties of Surfactant 4

Figure 4:
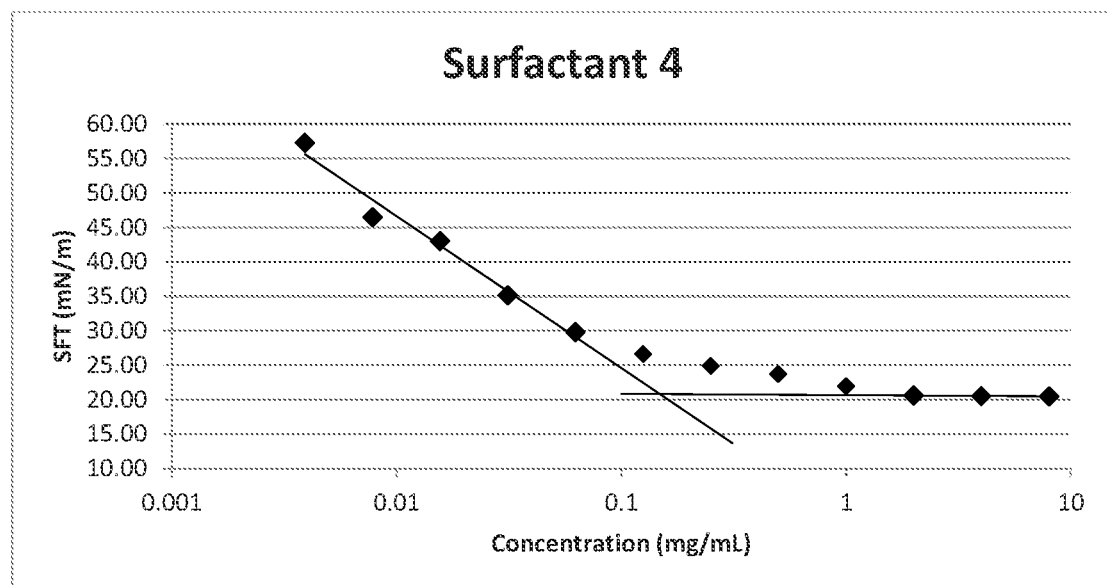
FIG. 4 shows a plot of surface tension versus concentration for Surfactant 4 as described in Example 5b.

The critical micelle concentration (CMC) for Surfactant 4 was measured. From the surface tension change with concentration in water, the CMC was determined to be about 0.2419 mmol. The plateau value of minimum surface tension that can be reached by this surfactant was about 20.54 mN/m, indicating that the surfactant has outstanding interfacial activity. These results are plotted as surface tension versus concentration in FIG. 4.

Example 6a: Synthesis of 6-((3-(1,1,1,5,5,5-hexamethyl-3-((trimethylsilyl)oxy)trisiloxan-3-yl)propyl)amino)-N-(2-(2-methoxyethoxy)ethyl)-N,N-dimethyl-6-oxohexan-1-aminium bromide (Surfactant 5)

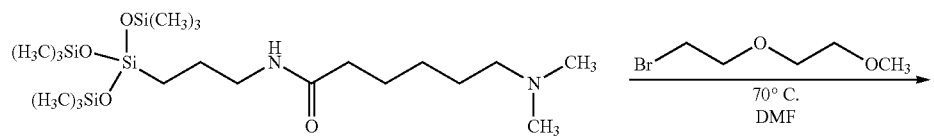

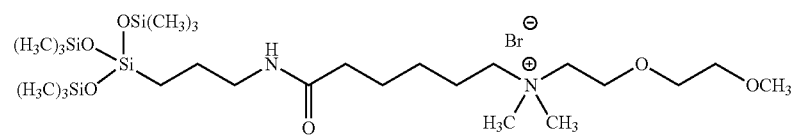

The siloxane derivative described in Example 1 (1.00 g, 2.02 mmol) was dissolved in dimethylformamide (DMF) (15 mL). 1-Bromo-2-(2-methoxyethoxy)ethane (2.4 mmol) was added, and the mixture was stirred for 12 hours at 70° C. The solvent was removed under vacuum, and the crude product was washed twice with hexanes to give Surfactant 5 as a brown liquid (800 mg).

Example 6b: Determination of Physical Properties of Surfactant 5

Figure 5:
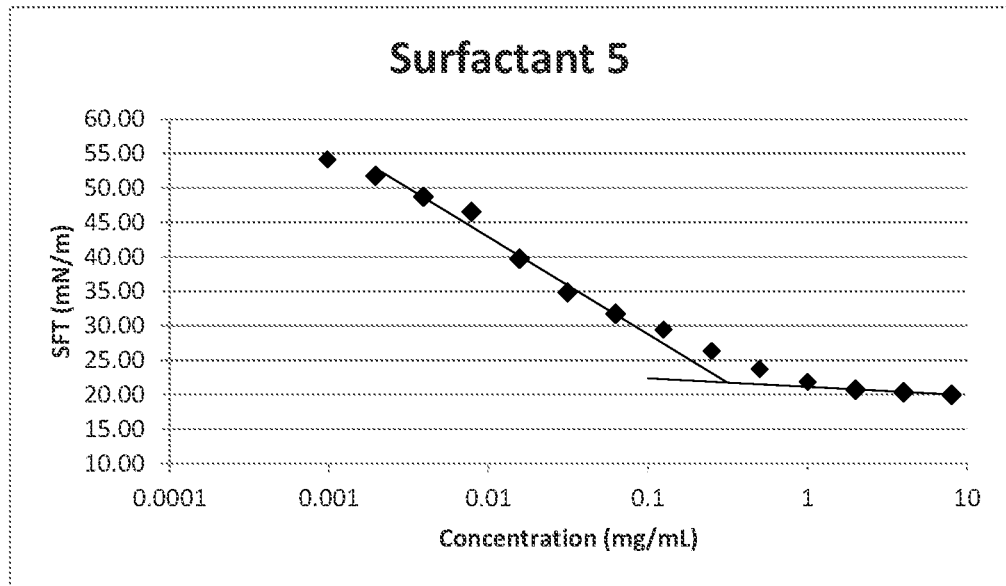
FIG. 5 shows a plot of surface tension versus concentration for Surfactant 5 as described in Example 6b.

The critical micelle concentration (CMC) for Surfactant 5 was measured. From the surface tension change with concentration in water, the CMC was determined to be about 0.4622 mmol. The plateau value of minimum surface tension that can be reached by this surfactant was about 20.40 mN/m, indicating that the surfactant has outstanding interfacial activity. These results are plotted as surface tension versus concentration in FIG. 5.

Example 7a: Synthesis of N-(3-(diethoxyphosphoryl)propyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide (Surfactant 6)

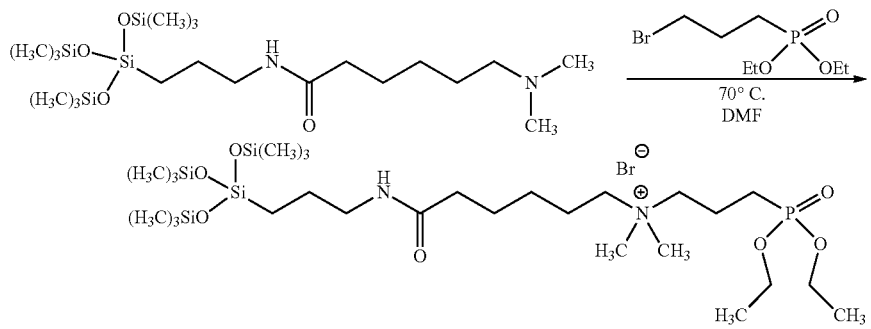

The siloxane derivative described in Example 1 (1.00 g, 2.02 mmol) was dissolved in dimethylformamide (DMF) (20 mL). Bromo phosphonate (4.04 mmol) was added, and the mixture was stirred for 12 hours at 70° C. The solvent was removed under vacuum, and the crude product was washed twice with hexanes to give Surfactant 6 as a brown liquid (900 mg).

Example 7b: Determination of Physical Properties of Surfactant 6

Figure 6:
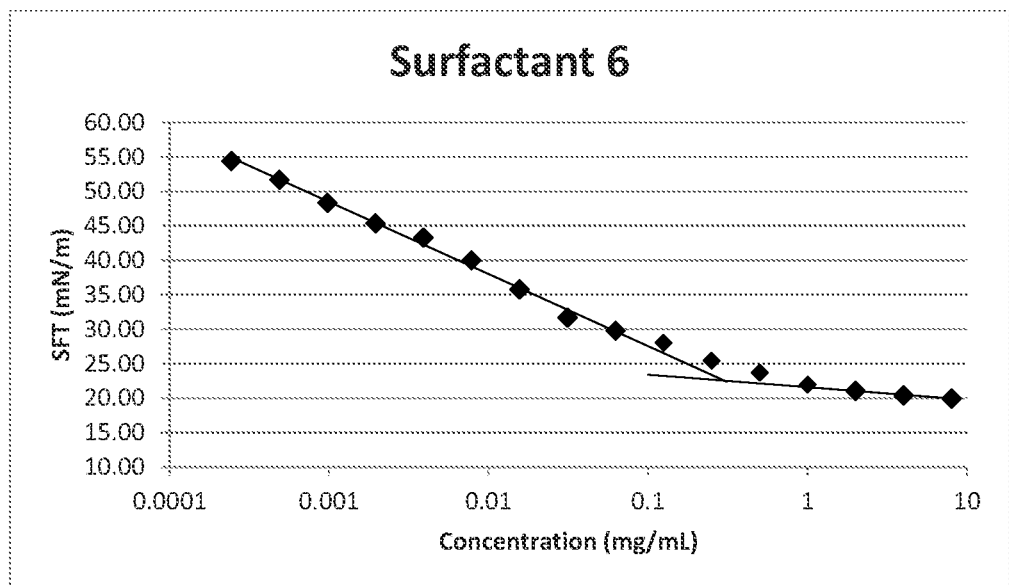
FIG. 6 shows a plot of surface tension versus concentration for Surfactant 6 as described in Example 7b.

The critical micelle concentration (CMC) for Surfactant 6 was measured. From the surface tension change with concentration in water, the CMC was determined to be about 0.3989 mmol. The plateau value of minimum surface tension that can be reached by this surfactant was about 20.48 mN/m, indicating that the surfactant has outstanding interfacial activity. These results are plotted as surface tension versus concentration in FIG. 6.

Example 8a: Synthesis of 6-((3-(1,1,1,5,5,5-hexamethyl-3-((trimethylsilyl)oxy)trisiloxan-3-yl)propyl)amino)-N-(3-hydroxypropyl)-N,N-dimethyl-6-oxohexan-1-aminium iodide (Surfactant 7)

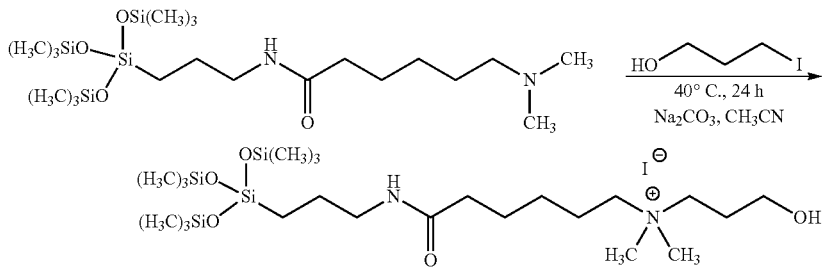

The siloxane derivative described in Example 1 (1.00 g, 2.02 mmol) was dissolved in acetonitrile (10 mL). Sodium carbonate (0.26 g) was added, followed by 3-iodopropanol (674 mg). The mixture was stirred for 24 hours at 40° C. Residual base was removed via filtration and the filtrate was concentrated. The crude product was washed twice with hexanes to remove excess iodopropanol and give Surfactant 7 as a brown liquid (780 mg).

Example 8b: Determination of Physical Properties of Surfactant 7

Figure 7:
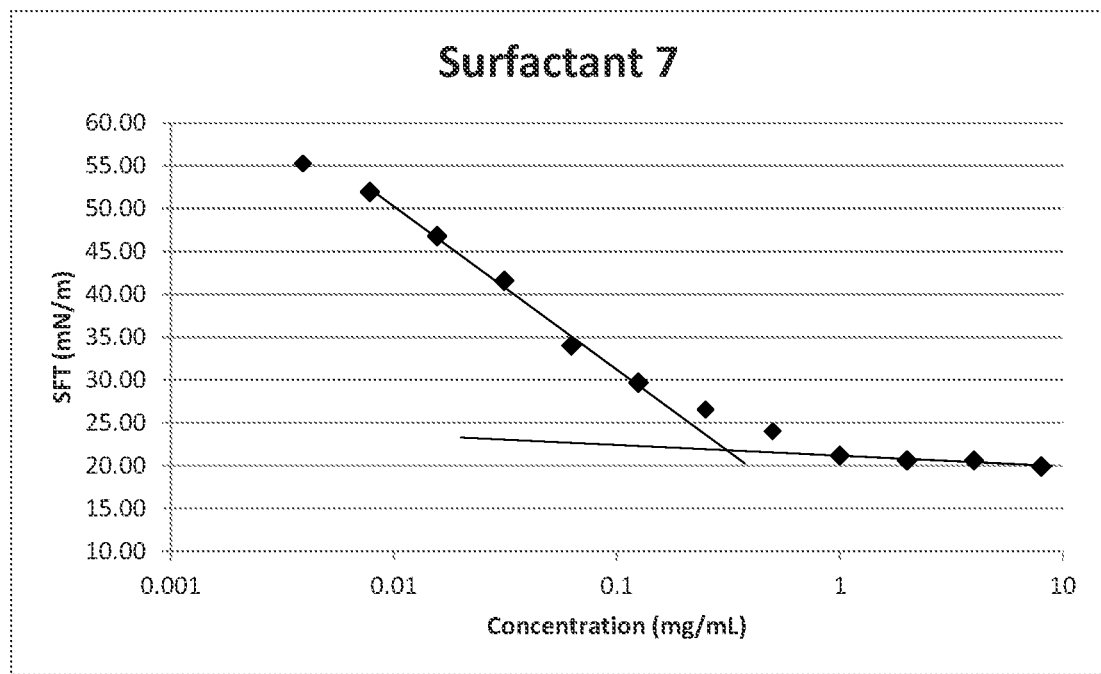
FIG. 7 shows a plot of surface tension versus concentration for Surfactant 7 as described in Example 8b.

The critical micelle concentration (CMC) for Surfactant 7 was measured. From the surface tension change with concentration in water, the CMC was determined to be about 0.4568 mmol. The plateau value of minimum surface tension that can be reached by this surfactant was about 20.61 mN/m, indicating that the surfactant has outstanding interfacial activity. These results are plotted as surface tension versus concentration in FIG. 7.

Example 9a: Synthesis of 6-((3-(1,1,1,5,5,5-hexamethyl-3-((trimethylsilyl)oxy)trisiloxan-3-yl)propyl)amino)-N-(2-hydroxyethyl)-N,N-dimethyl-6-oxo-hexan-1-aminium iodide (Surfactant 8)

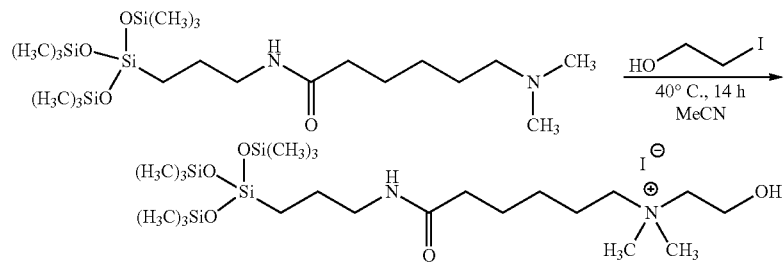

The siloxane derivative described in Example 1 (1.00 g, 2.02 mmol) was dissolved in acetonitrile (10 mL). 2-Iodoethanol (4.04 mmol) was added, and the mixture was stirred for 14 hours at 40° C. The solvent was removed, and the crude product was washed twice with hexanes to give Surfactant 8 (910 mg).

Example 9b: Determination of Physical Properties of Surfactant 8

Figure 8:
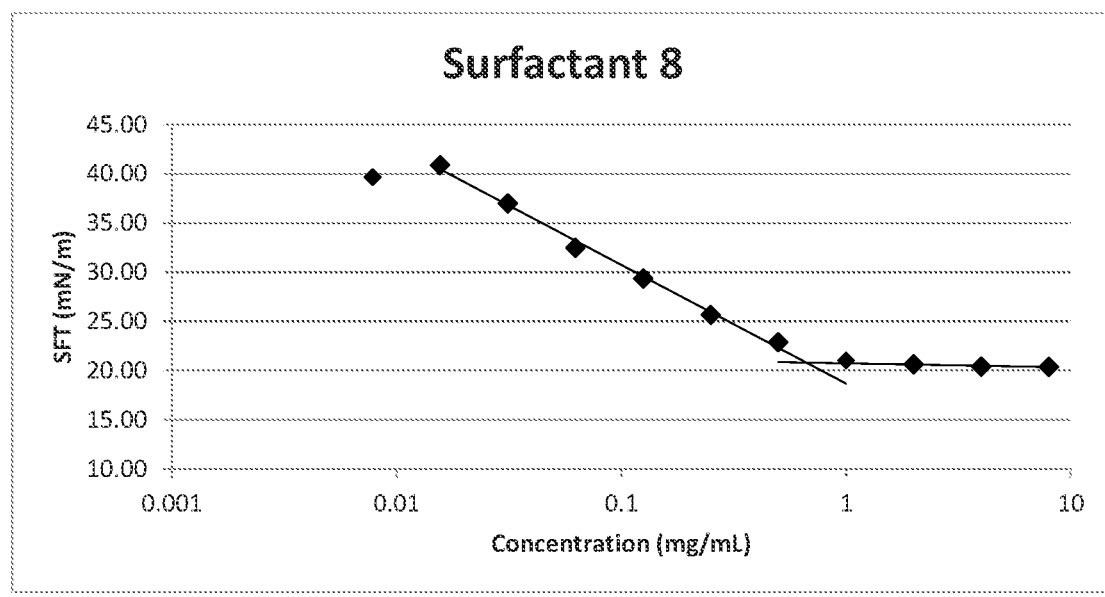
FIG. 8 shows a plot of surface tension versus concentration for Surfactant 8 as described in Example 9b.

The critical micelle concentration (CMC) for Surfactant 8 was measured. From the surface tension change with concentration in water, the CMC was determined to be about 0.9986 mmol. The plateau value of minimum surface tension that can be reached by this surfactant was about 20.41 mN/m, indicating that the surfactant has outstanding interfacial activity. These results are plotted as surface tension versus concentration in FIG. 8.

Example 10a: Synthesis of $N^1,N^3$-bis(6-((3-(1,1,1,5,5,5-hexamethyl-3-((trimethylsilyl)oxy)trisiloxan-3-yl)propyl)amino)-6-oxohexyl)-$N^1,N^1,N^3,N^3$-tetramethylpropane-1,3-diaminium dibromide (Surfactant 10)

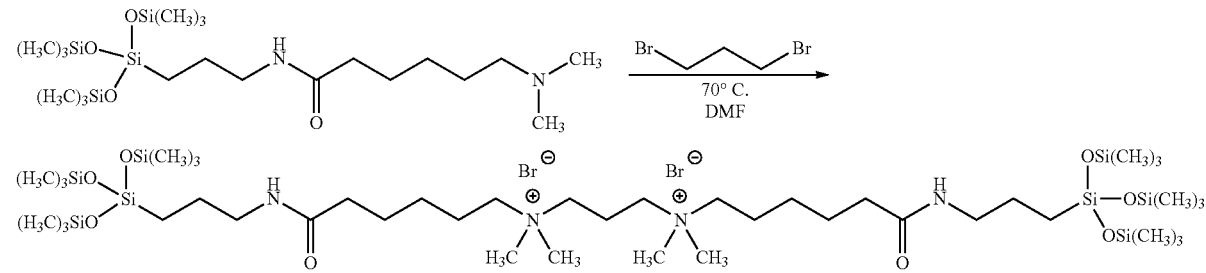

The siloxane derivative described in Example 1 (1.00 g, 2.02 mmol) was dissolved in dimethylformamide (DMF) (20 mL). 1,2-Dibromopropane (1 mmol) was added, and the mixture was stirred for 12 hours at 70° C. The solvent was removed, and the crude product was washed twice with hexanes to give Surfactant 10 as a brown liquid (900 mg).

Example 10b: Determination of Physical Properties of Surfactant 10

Figure 10:
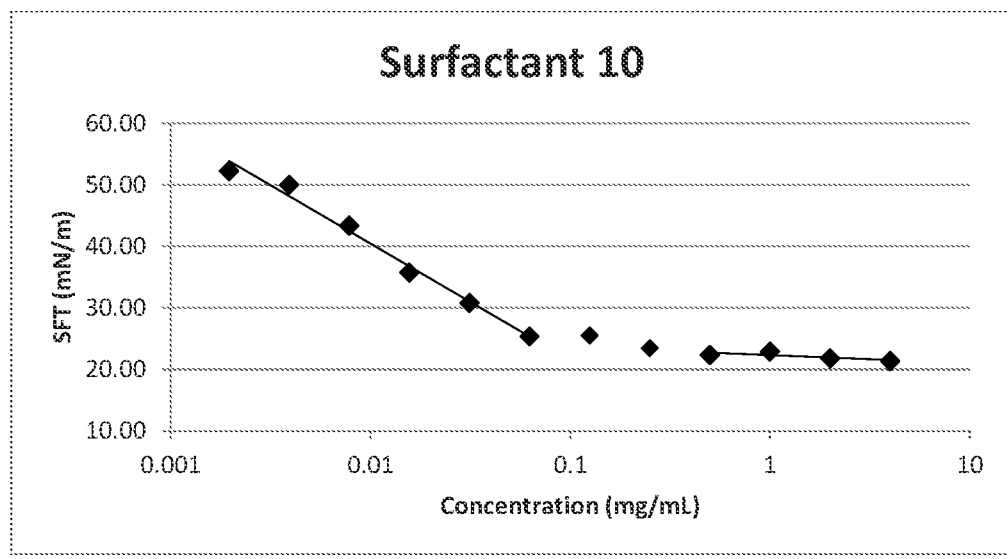
FIG. 10 shows a plot of surface tension versus concentration for Surfactant 10 as described in Example 10b.

The critical micelle concentration (CMC) for Surfactant 10 was measured. From the surface tension change with concentration in water, the CMC was determined to be about 0.0631 mmol. The plateau value of minimum surface tension that can be reached by this surfactant was about 22.12 mN/m, indicating that the surfactant has interfacial activity. These results are plotted as surface tension versus concentration in FIG. 10.

Example 11a: Synthesis of N-(5-carboxypentyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide (Surfactant 9a)

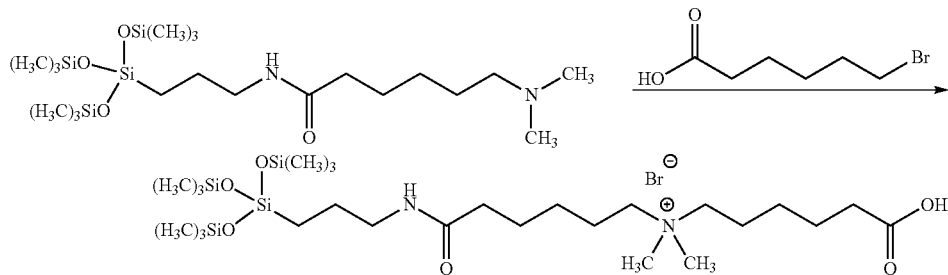

The siloxane derivative described in Example 1 (1 g, 2.02 mmol) was dissolved in dimethylformamide (DMF) (15 mL) and 6-bromohexanoic acid (2.02 mmol) was added. The mixture was stirred for 12 hours at 70° C., after which the solvent was removed under vacuum. The crude product was washed twice with hexane to provide N-(5-carboxypentyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide as a sticky brown liquid (650 mg).

Example 11b: Determination of Physical Properties of Surfactant 9a

Figure 9A:
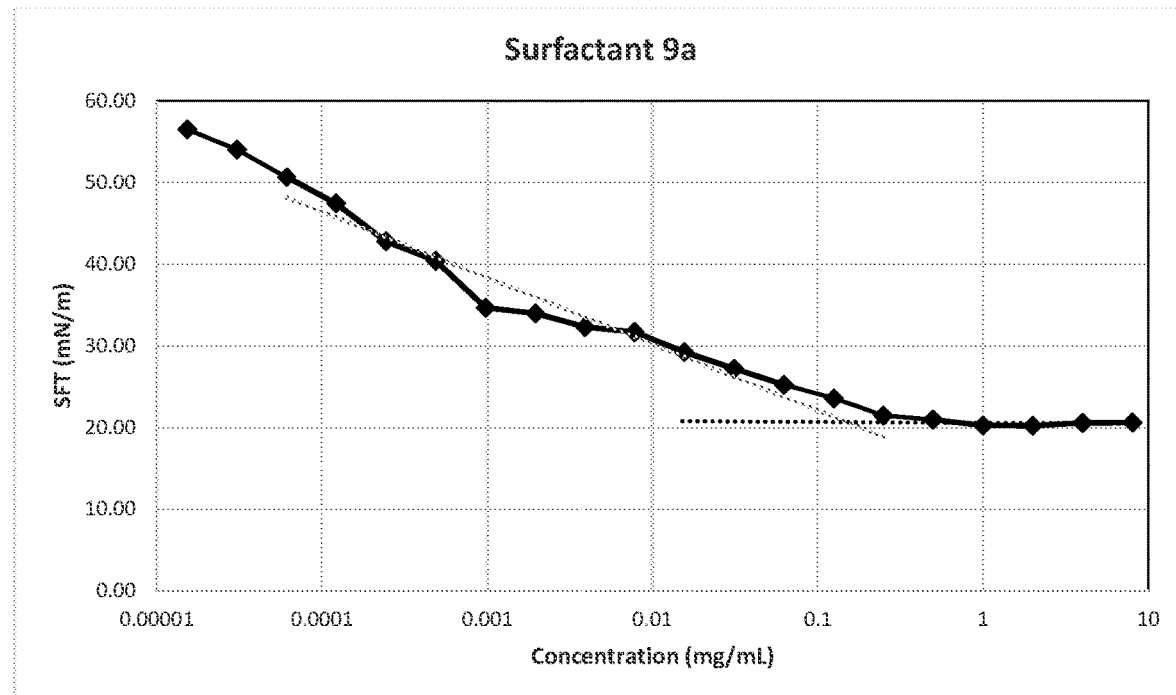
FIG. 9a shows a plot of surface tension versus concentration for Surfactant 9a as described in Example 11b.

The critical micelle concentration (CMC) for Surfactant 9a was measured. From the surface tension change with concentration in water, the CMC was determined to be about 0.2237 mmol. The plateau value of minimum surface tension that can be reached by this surfactant was about 20.52 mN/m, indicating that the surfactant has excellent interfacial activity. These results are plotted as surface tension versus concentration in FIG. 9a.

Comparative Example A1: Synthesis of N-(carboxymethyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide (Surfactant 9b)

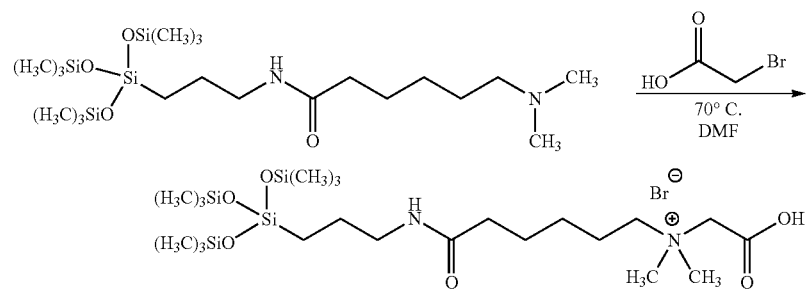

The siloxane derivative described in Example 1 (1.00 g, 2.02 mmol) was dissolved in dimethylformamide (DMF) (15 mL). Bromoacetic acid (2.02 mmol) was added, and the mixture was stirred for 12 hours at 70° C. The solvent was removed, and the crude product was washed twice with hexanes to give Surfactant 9b as a brown liquid (700 mg).

Comparative Example A2: Determination of Physical Properties of Surfactant 9b

Figure 9B:
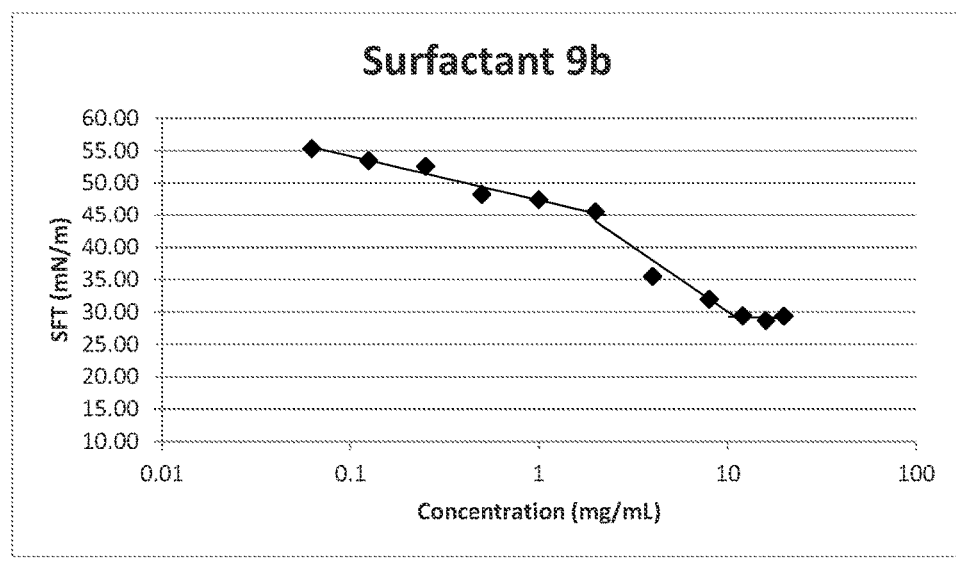
FIG. 9b shows a plot of surface tension versus concentration for Surfactant 9b as described in Comparative Example A2.

The critical micelle concentration (CMC) for Surfactant 9b was measured. From the surface tension change with concentration in water, the CMC was determined to be about 17.28 mmol. The plateau value of minimum surface tension that can be reached by this surfactant was about 29.16 mN/m. These results are plotted as surface tension versus concentration in FIG. 9. The results show the difficulty in predicting surfactant activity on the basis of chemical structure; Surfactant 9a, which differs only in the number of methylene groups in the carboxylic acid, displays excellent activity.

Example 12: Synthesis of N-(4-(4-carboxyphenyl)butyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide (Surfactant 11a)

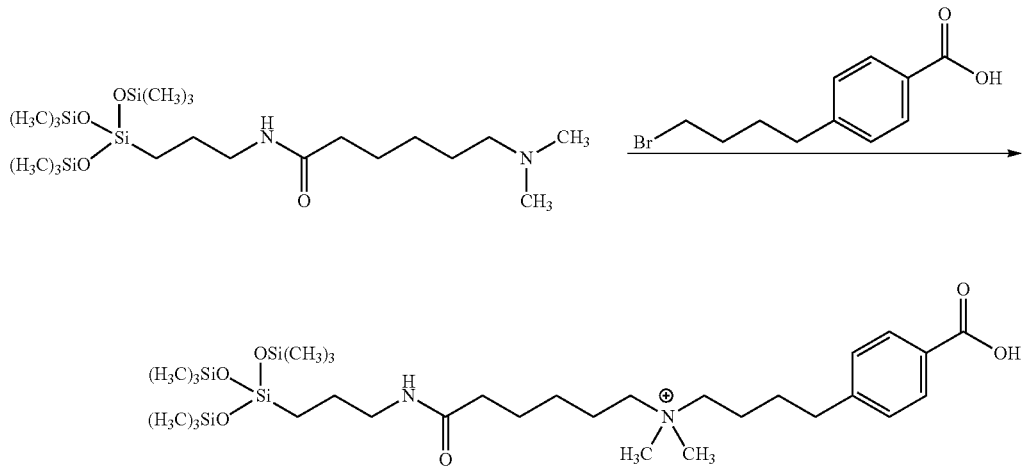

To the siloxane derivative described in Example 1 is added 4-(4-bromobutyl)benzoic acid to provide N-(4-(4-carboxyphenyl)butyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide.

Example 13: Synthesis of N-(4-carboxybenzyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide (Surfactant 11b)

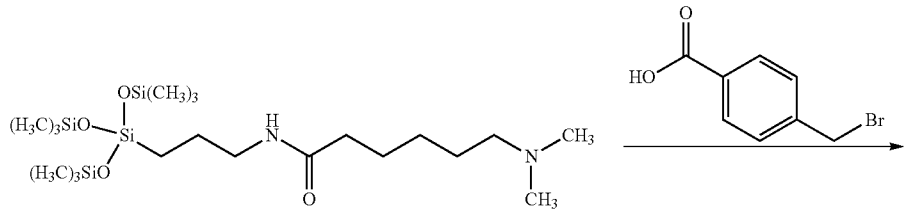

-continued

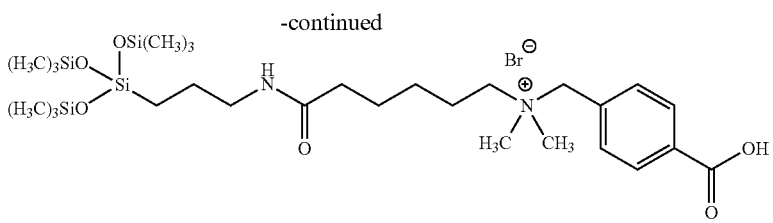

To the siloxane derivative described in Example 1 is added 4-(bromomethyl)benzoic acid to provide N-(4-carboxybenzyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide.

ASPECTS

Aspect 1 is a Compound of Formula I:

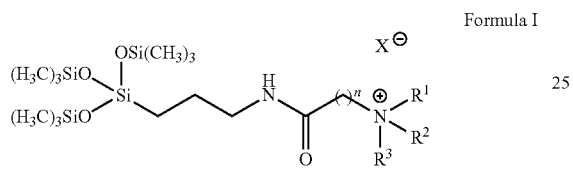

Formula I wherein $R^1$ and $R^2$ are the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate; $R^3$ is selected from the group consisting of alkenyl, alkynyl, ester, alcohol, aryl alkyl, alkoxy alkyl ether, alkyl phosphate, $C_3$-$C_8$ carboxylic acid, $C_1$-$C_{10}$ alkyl benzoic acid, and a $C_1$-$C_6$ linker attached to a second molecule of Formula I, wherein the second molecule is the same or different; n is an integer from 1 to 12; and X is selected from the group consisting of chloride, bromide, and iodide.

Aspect 2 is the compound of Aspect 1, wherein $R^3$ is selected from the group consisting of $C_2$-$C_{10}$ alkenyl, $C_2$-$C_{10}$ alkynyl, $C_2$-$C_{12}$ ester, $C_1$-$C_{10}$ hydroxyl, benzyl, $C_2$-$C_{12}$ alkoxy alkyl ether, alkyl phosphate, $C_3$-$C_8$ carboxylic acid, $C_1$-$C_{10}$ alkyl benzoic acid, and a three-carbon linker attached to a second molecule of Formula I, wherein the second molecule is the same as the first molecule.

Aspect 3 is the compound of either Aspect 1 or Aspect 2, wherein $R^3$ is selected from the formulas consisting of:

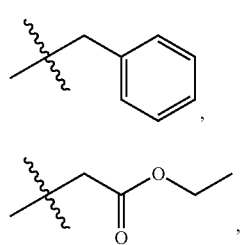

R$^{3.1}$

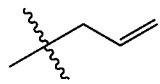

R$^{3.2}$

-continued

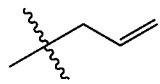

R$^{3.3}$

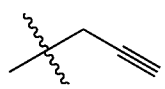

R$^{3.4}$

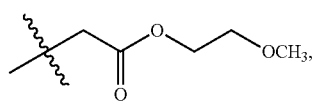

R$^{3.5}$

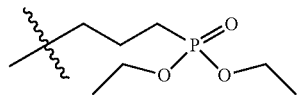

R$^{3.6}$

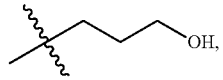

R$^{3.7}$

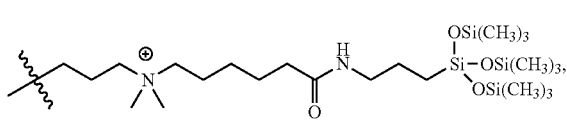

R$^{3.8}$

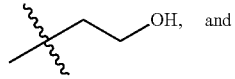

R$^{3.9}$

OH, and

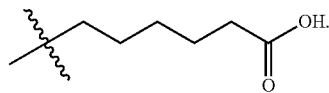

R$^{3.10a}$

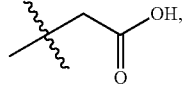

R$^{3.10b}$

Aspect 4 is the compound of any one of Aspects 1 to 3, wherein $R^1$ and $R^2$ are methyl.

Aspect 5 is the compound of any one of Aspects 1 to 4, wherein n is 5.

Aspect 6 is the compound of any one of Aspects 1 to 5, wherein the compound is N-benzyl-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

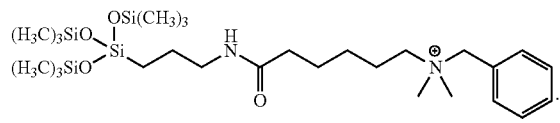
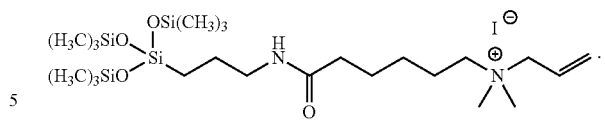

Aspect 7 is the compound of any one of Aspects 1 to 5, wherein the compound is N-(2-ethoxy-2-oxoethyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

Aspect 9 is the compound of any one of Aspects 1 to 5, wherein the compound is 6-((3-(1,1,1,5,5,5-hexamethyl-3-((trimethylsilyl)oxy)trisiloxan-3-yl)propyl)amino)-N,N-dimethyl-6-oxo-N-(prop-2-yn-1-yl)hexan-1-aminium bromide, having the following formula:

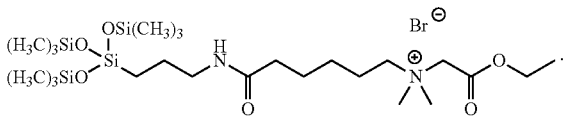
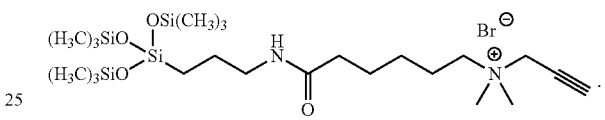

Aspect 8 is the compound of any one of Aspects 1 to 5, wherein the compound is N-allyl-6-((3-(1,1,1,5,5,5-hexamethyl-3-((trimethylsilyl)oxy)trisiloxan-3-yl)propyl)amino)-N,N-dimethyl-6-oxohexan-1-aminium iodide, having the following formula:

Aspect 10 is the compound of any one of Aspects 1 to 5, wherein the compound is 6-((3-(1,1,1,5,5,5-hexamethyl-3-((trimethylsilyl)oxy)trisiloxan-3-yl)propyl)amino)-N-(2-(2-methoxyethoxy)ethyl)-N,N-dimethyl-6-oxohexan-1-aminium bromide, having the following formula:

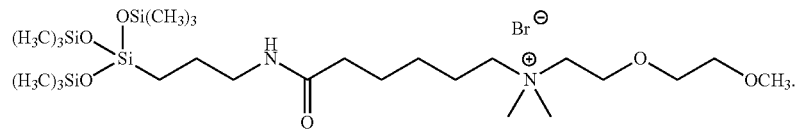

Aspect 11 is the compound of any one of Aspects 1 to 5, wherein the compound is N-(3-(diethoxyphosphoryl)propyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

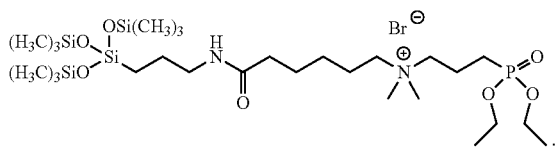

Aspect 12 is the compound of any one of Aspects 1 to 5, wherein the compound is 6-((3-(1,1,1,5,5,5-hexamethyl-3-((trimethylsilyl)oxy)trisiloxan-3-yl)propyl)amino)-N-(3-hydroxypropyl)-N,N-dimethyl-6-oxohexan-1-aminium iodide, having the following formula:

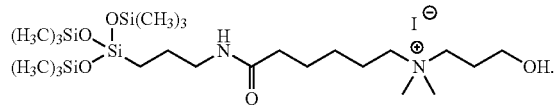

Aspect 13 is the compound of any one of Aspects 1 to 5, wherein the compound is 6-((3-(1,1,1,5,5,5-hexamethyl-3-((trimethylsilyl)oxy)trisiloxan-3-yl)propyl)amino)-N-(2-hydroxyethyl)-N,N-dimethyl-6-oxohexan-1-aminium iodide, having the following formula:

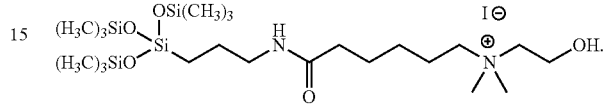

Aspect 14 is the compound of any one of Aspects 1 to 5, wherein the compound is N-(5-carboxypentyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

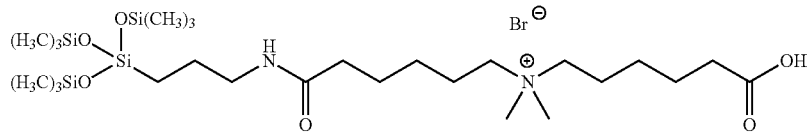

Aspect 15 is the compound of any one of Aspects 1 to 5, wherein the compound is $N^1,N^3$-bis(6-((3-(1,1,1,5,5,5-hexamethyl-3-((trimethylsilyl)oxy)trisiloxan-3-yl)propyl)amino)-6-oxohexyl)-$N^1,N^1,N^3,N^3$-tetramethylpropane-1,3-diaminium dibromide, having the formula:

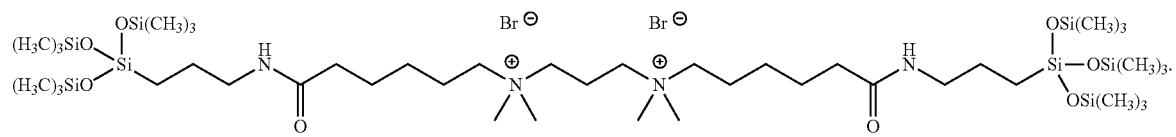

Aspect 16 is a method of synthesizing a compound of Formula I

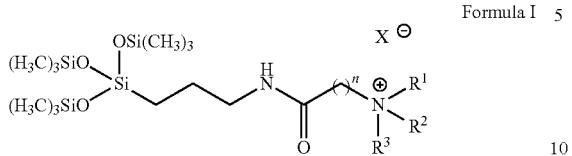

wherein $R^1$ and $R^2$ are the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate; $R^3$ is selected from the group consisting of alkenyl, alkynyl, ester, alcohol, aryl alkyl, alkoxy alkyl ether, alkyl phosphate, $C_3$-$C_8$ carboxylic acid, $C_1$-$C_{10}$ alkyl benzoic acid, and a $C_1$-$C_6$ linker attached to a second molecule of Formula I, wherein the second molecule is the same or different; n is an integer from 1 to 12; and X is selected from the group consisting of chloride, bromide, and iodide, the method comprising: a ring opening step to open lactam ring to provide an amino acid having an N-terminus and a C-terminus; a first alkylation step, to alkylate the N-terminus to provide a tertiary amine; a coupling step, to react the C-terminus with 3-aminopropyltris(trimethylsiloxy)silane to provide siloxane derivative; and a second alkylation step, to alkylate the N-terminus to provide a quaternary amine of Formula I.

Aspect 17 is the method of Aspect 16, wherein the lactam is caprolactam.

Aspect 18 is the method of either Aspect 16 or Aspect 17, wherein in the first alkylation step, the tertiary amine is 6-(dimethylamino)hexanoic acid.

Aspect 19 is the method of any one of Aspects 16 to 18, wherein in the second alkylation step, the N-terminus is alkylated with an alkylating agent selected from the group consisting of benzyl bromide, ethyl bromoacetate, allyl iodide, propargyl bromide, 1-bromo-2-(2-methoxyethoxy)ethane, bromo phosphonate, 3-iodopropanol, 3-bromopropanol, 2-iodoethanol, 2-bromoethanol, 6-bromohexanoic acid, and 1,3-dibromopropane.

The invention claimed is:
1. A compound of Formula I:

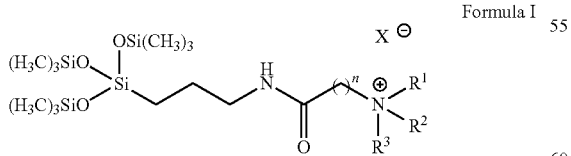

wherein $R^1$ and $R^2$ are the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

$R^3$ is selected from the group consisting of alkenyl, alkynyl, ester, alcohol, aryl alkyl, alkoxy alkyl ether, alkyl phosphate, $C_3$-$C_8$ carboxylic acid, $C_1$-$C_{10}$ alkyl benzoic acid, and a $C_1$-$C_6$ linker attached to a second molecule of Formula I, wherein the second molecule is the same or different;

n is an integer from 1 to 12; and

X is selected from the group consisting of chloride, bromide, and iodide.

2. The compound of claim 1, wherein $R^3$ is selected from the group consisting of $C_2$-$C_{10}$ alkenyl, $C_2$-$C_{10}$ alkynyl, $C_2$-$C_{12}$ ester, $C_1$-$C_{10}$ hydroxyl, benzyl, $C_2$-$C_{12}$ alkoxy alkyl ether, alkyl phosphate, $C_3$-$C_8$ carboxylic acid, $C_1$-$C_{10}$ alkyl benzoic acid, and a three-carbon linker attached to a second molecule of Formula I, wherein the second molecule is the same as the first molecule.

3. The compound of claim 1, wherein $R^3$ is selected from the formulas consisting of:

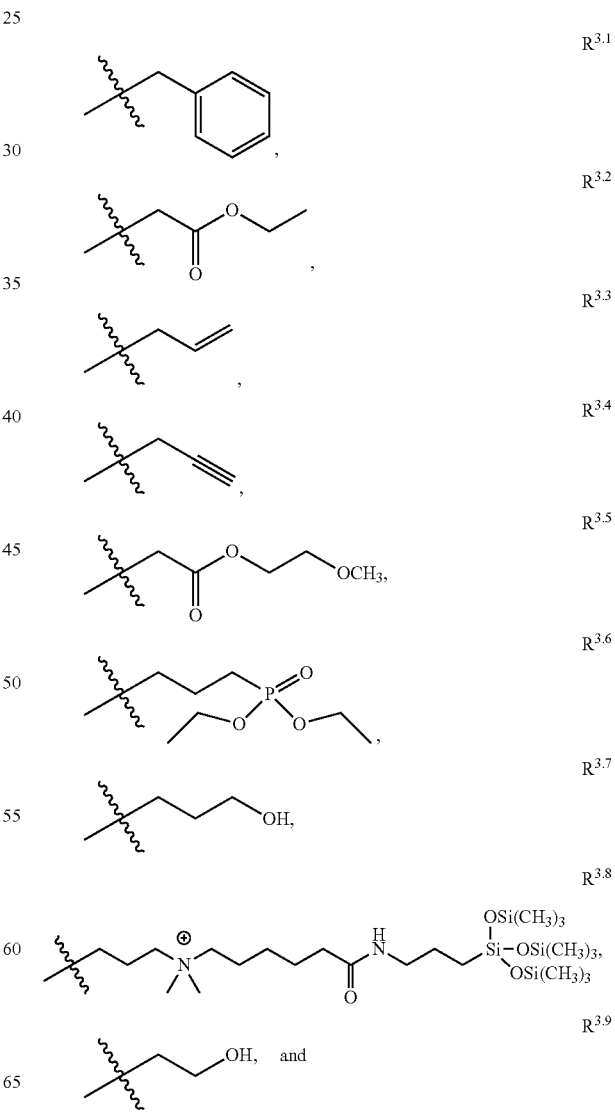

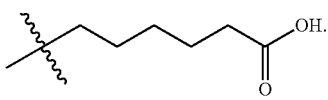

4. The compound of claim 1, wherein R¹ and R² are methyl.

5. The compound of claim 1, wherein n is 5.

6. The compound of claim 1, wherein the compound is N-benzyl-6-((3-(1,1,1,5,5,5-hexamethyl-3-((trimethylsilyl)oxy)trisiloxan-3-yl)propyl)amino)-N,N-dimethyl-6-oxo-hexan-1-aminium bromide, having the following formula:

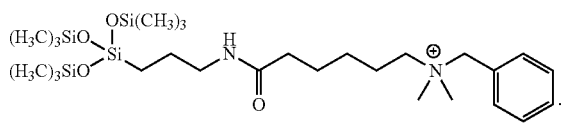

7. The compound of claim 1, wherein the compound is N-(2-ethoxy-2-oxoethyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

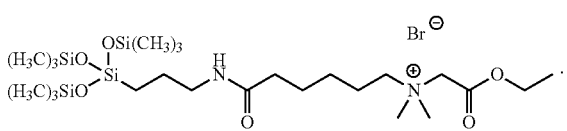

8. The compound of claim 1, wherein the compound is N-allyl-6-((3-(1,1,1,5,5,5-hexamethyl-3-((trimethylsilyl)oxy)trisiloxan-3-yl)propyl)amino)-N,N-dimethyl-6-oxo-hexan-1-aminium iodide, having the following formula:

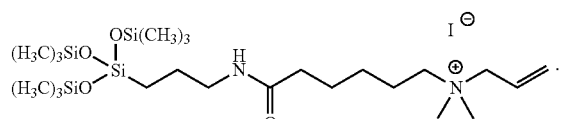

9. The compound of claim 1, wherein the compound is 6-((3-(1,1,1,5,5,5-hexamethyl-3-((trimethylsilyl)oxy)trisiloxan-3-yl)propyl)amino)-N,N-dimethyl-6-oxo-N-(prop-2-yn-1-yl)hexan-1-aminium bromide, having the following formula:

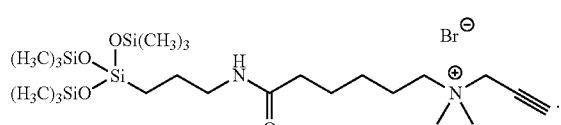

10. The compound of claim 1, wherein the compound is 6-((3-(1,1,1,5,5,5-hexamethyl-3-((trimethylsilyl)oxy)trisiloxan-3-yl)propyl)amino)-N-(2-(2-methoxyethoxy)ethyl)-N,N-dimethyl-6-oxohexan-1-aminium bromide, having the following formula:

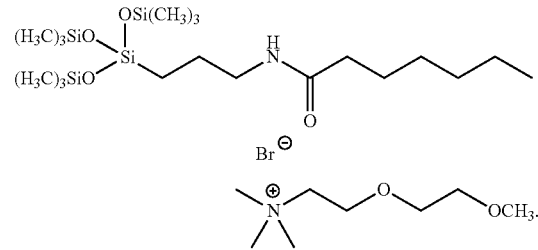

11. The compound of claim 1, wherein the compound is N-(3-(diethoxyphosphoryl)propyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

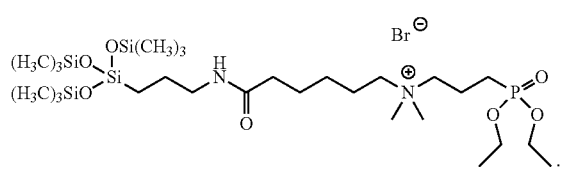

12. The compound of claim 1, wherein the compound is 6-((3-(1,1,1,5,5,5-hexamethyl-3-((trimethylsilyl)oxy)trisiloxan-3-yl)propyl)amino)-N-(3-hydroxypropyl)-N,N-dimethyl-6-oxohexan-1-aminium iodide, having the following formula:

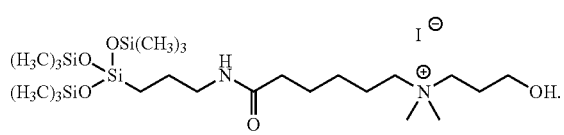

13. The compound of claim 1, wherein the compound is 6-((3-(1,1,1,5,5,5-hexamethyl-3-((trimethylsilyl)oxy)trisiloxan-3-yl)propyl)amino)-N-(2-hydroxyethyl)-N,N-dimethyl-6-oxohexan-1-aminium iodide, having the following formula:

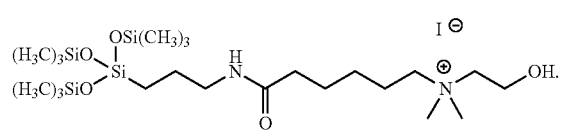

14. The compound of claim 1, wherein the compound is N-(5-carboxypentyl)-6-((3-(1,1,1,5,5,5-hexamethyl-3-((trimethylsilyl)oxy)trisiloxan-3-yl)propyl)amino)-N,N-dimethyl-6-oxohexan-1-aminium bromide, having the following formula:

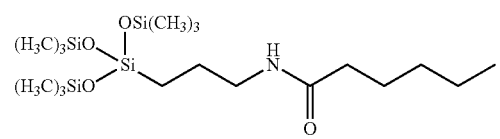

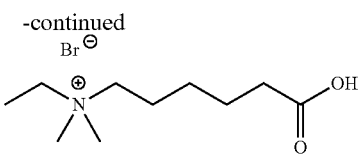

15. The compound of claim 1, wherein the compound is N¹,N³-bis(6-((3-(1,1,1,5,5,5-hexamethyl-3-((trimethylsilyl)oxy)trisiloxan-3-yl)propyl)amino)-6-oxohexyl)-N¹,N¹,N³,N³-tetramethylpropane-1,3-diaminium dibromide, having the formula:

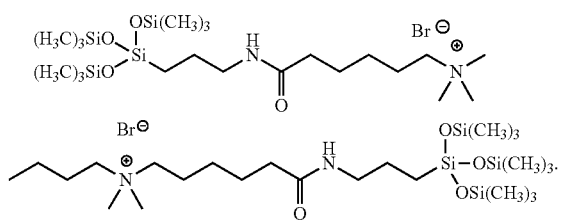

16. A method of synthesizing a compound of Formula I

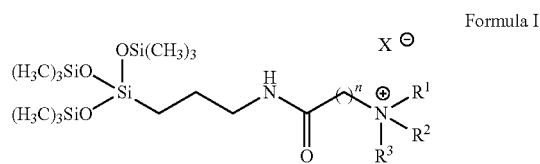

Formula I wherein $R^1$ and $R^2$ are the same or different, and comprise at least one group selected from the group consisting of $C_1$-$C_6$ alkyl, optionally the $C_1$-$C_6$ alkyl may include one or more of oxygen, nitrogen, or sulfur atoms or groups that include at least one of these atoms, and the alkyl chain may be optionally substituted with one or more substituents selected from the group consisting of hydroxyl, amino, amido, sulfonyl, sulfonate, carbonyl, carboxyl, and carboxylate;

$R^3$ is selected from the group consisting of alkenyl, alkynyl, ester, alcohol, aryl alkyl, alkoxy alkyl ether, alkyl phosphate, $C_3$-$C_8$ carboxylic acid, $C_1$-$C_{10}$ alkyl benzoic acid, and a $C_1$-$C_6$ linker attached to a second molecule of Formula I, wherein the second molecule is the same or different;

n is an integer from 1 to 12; and

X is selected from the group consisting of chloride, bromide, and iodide, the method comprising:

a ring opening step to open lactam ring to provide an amino acid having an N-terminus and a C-terminus;

a first alkylation step, to alkylate the N-terminus to provide a tertiary amine;

a coupling step, to react the C-terminus with 3-aminopropyltris(trimethylsiloxy)silane to provide siloxane derivative; and a second alkylation step, to alkylate the N-terminus to provide a quaternary amine of Formula I.

17. The method of claim 16, wherein the lactam is caprolactam.

18. The method of claim 16, wherein in the first alkylation step, the tertiary amine is 6-(dimethylamino)hexanoic acid.

19. The method of claim 16, wherein in the second alkylation step, the N-terminus is alkylated with an alkylating agent selected from the group consisting of benzyl bromide, ethyl bromoacetate, allyl iodide, propargyl bromide, 1-bromo-2-(2-methoxyethoxy)ethane, bromo phosphonate, 3-iodopropanol, 3-bromopropanol, 2-iodoethanol, 2-bromoethanol, 6-bromohexanoic acid, and 1,3-dibromopropane.

* * * * *